(12) United States Patent
Nogami et al.

(10) Patent No.: US 12,394,036 B2
(45) Date of Patent: Aug. 19, 2025

(54) INFORMATION PROCESSING DEVICE, INFORMATION PROCESSING METHOD, AND STORAGE MEDIUM

(71) Applicant: CANON KABUSHIKI KAISHA, Tokyo (JP)

(72) Inventors: Atsushi Nogami, Kawasaki (JP); Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/423,389

(22) Filed: Jan. 26, 2024

(65) Prior Publication Data

US 2024/0161265 A1  May 16, 2024

Related U.S. Application Data

(63) Continuation of application No. 17/667,567, filed on Feb. 9, 2022, now Pat. No. 11,922,615, which is a (Continued)

(30) Foreign Application Priority Data

May 22, 2017 (JP) .................................. 2017-101142
May 2, 2018 (JP) .................................. 2018-088863

(51) Int. Cl.
*G06T 7/00* (2017.01)
*G06F 3/14* (2006.01)
(Continued)

(52) U.S. Cl.
CPC .............. *G06T 7/0004* (2013.01); *G06F 3/14* (2013.01); *G06F 18/2431* (2023.01); *G06T 7/11* (2017.01);
(Continued)

(58) Field of Classification Search
CPC . G06T 7/0004; G06T 7/11; G06T 7/73; G06T 2207/20081; G06T 2207/20084;
(Continued)

(56) References Cited

U.S. PATENT DOCUMENTS 8,478,010 B2   7/2013  Matsuda
9,639,927 B2   5/2017  Yamato
(Continued)

FOREIGN PATENT DOCUMENTS

CN    102065744 A    5/2011
CN    103957771 A    7/2014
(Continued)

OTHER PUBLICATIONS

Bharath Hariharan, et al., "Hypercolumns for Object Segmentation and Fine-grained Localization," The IEEE Conference on Computer Vision and Pattern Recognition (CVPR), 2015, pp. 1-10.
(Continued)

*Primary Examiner* — Ping Y Hsieh
(74) *Attorney, Agent, or Firm* — Venable LLP

(57) ABSTRACT

There is provided with an information processing device. A defect detecting unit detects a defect of an object in an input image. An extracting unit extracts a feature amount pertaining to a partial image of the defect from the input image, on the basis of a result of detecting the defect. An attribute determining unit determines an attribute of the defect using the feature amount pertaining to the partial image of the defect.

11 Claims, 14 Drawing Sheets

Related U.S. Application Data continuation of application No. 16/682,460, filed on Nov. 13, 2019, now Pat. No. 11,282,185, which is a continuation of application No. PCT/JP2018/019370, filed on May 18, 2018.

(51) Int. Cl.
| | |
|---|---|
| *G06F 18/2431* | (2023.01) |
| *G06T 7/11* | (2017.01) |
| *G06T 7/73* | (2017.01) |
| *G06V 10/764* | (2022.01) |
| *G06V 10/82* | (2022.01) |
| *G06V 20/52* | (2022.01) |

(52) U.S. Cl.
CPC .............. *G06T 7/73* (2017.01); *G06V 10/764* (2022.01); *G06V 10/82* (2022.01); *G06V 20/52* (2022.01); *G06T 2207/20081* (2013.01); *G06T 2207/20084* (2013.01); *G06T 2207/30132* (2013.01); *G06T 2207/30184* (2013.01)

(58) Field of Classification Search
CPC . G06T 2207/30132; G06T 2207/30184; G06T 7/62; G06F 3/14; G06F 18/2431; G06V 10/764; G06V 10/82; G06V 20/52
See application file for complete search history.

(56) References Cited

U.S. PATENT DOCUMENTS

| | | | |
|---|---|---|---|
| 10,521,865 B1* | 12/2019 | Spader | G06T 7/593 |
| 11,282,185 B2 | 3/2022 | Nogami | |
| 11,288,789 B1* | 3/2022 | Chen | G06T 7/001 |
| 11,922,615 B2* | 3/2024 | Nogami | G06F 3/14 |
| 2006/0029257 A1* | 2/2006 | Eguchi | G06T 7/60 382/108 |
| 2010/0266195 A1 | 10/2010 | Iwanaga | |
| 2011/0050933 A1 | 3/2011 | Omi | |
| 2011/0063469 A1 | 3/2011 | Omi et al. | |
| 2011/0085717 A1 | 4/2011 | Matsuda | |
| 2013/0077850 A1 | 3/2013 | Hirai et al. | |
| 2014/0270377 A1 | 9/2014 | Yamato | |
| 2016/0192832 A1 | 7/2016 | Kamiyama et al. | |
| 2019/0003830 A1 | 1/2019 | Irie | |
| 2019/0094155 A1 | 3/2019 | Honda et al. | |
| 2019/0147283 A1* | 5/2019 | Giering | G06V 10/82 382/103 |
| 2022/0092856 A1* | 3/2022 | Wu | G06V 20/17 |
| 2023/0137389 A1* | 5/2023 | Davis | G06T 7/62 705/4 |

FOREIGN PATENT DOCUMENTS

| | | |
|---|---|---|
| CN | 105530851 A | 4/2016 |
| JP | 2000-028541 A | 1/2000 |
| JP | 2006-162477 A | 6/2006 |
| JP | 2009-103720 A | 5/2009 |
| JP | 2009-133085 A | 6/2009 |
| JP | 2009-133805 A | 6/2009 |
| JP | 2012-002531 A | 1/2012 |
| JP | 2013-250058 A | 12/2013 |
| JP | 2017-072517 A | 4/2017 |

OTHER PUBLICATIONS

Aug. 7, 2018 International Search Report in International Patent Appln. No. PCT/JP2018/019370.

Hung-Chi Chung, et al., "GIS-based automated management of highway surface crack inspection system," Proceedings of SPIE, Nondestructive Detection and Measurement for Homeland Security II, vol. 5395, Jul. 14, 2004, XP055762528, pp. 70-81.

Fernandes Kelwin, et al., "Pavement pathologies classification using graph-based features," 2014 IEEE International Conference on Image Processing (ICIP), IEEE, Oct. 27, 2014, XP032966701, pp. 793-797.

Qingquan Li, et al., "Pavement Crack Classification via Spatial Distribution Features," Eurasip Journal on Advances in Signal Processing, vol. 2011, No. 1, Mar. 20, 2011, XP055762532, pp. 1-12.

Young-Jin Cha, et al., "Deep Learning-Based Crack Damage Detection Using Convolutional Neural Networks: Deep learning-based crack damage detection using CNNs," Computer-Aided Civil and Infrastructure Engineering, vol. 32, No. 5, Mar. 23, 2017, XP055509523, pp. 361-378.

H. Zakeri, et al., "Image Based Techniques for Crack Detection, Classification and Quantification in Asphalt Pavement: A Review," Archives of Computational Methods in Engineering, Springer Netherlands, Dordrecht, vol. 24, No. 4, Sep. 17, 2016, XP036338096, pp. 935-977.

Jan. 18, 2021 European Search Report in European Patent Appln. No. 18805451.4.

Nov. 25, 2022 Chinese Official Action in Chinese Patent Appln. No. 201880034034.9.

May 8, 2023 European Official Action in European Patent Appln. No. 18805451.4.

Sep. 1, 2023 Chinese Official Action in Chinese Patent Appln. No. 201880034034.9.

Hypercolumns for Object Segmentation article.

"GIS-based automated management of highway surface crack inspection system" article.

"Pavement pathologies classification using graph-based features" article.

"Pavement Crack Classification via Spatial Distribution Features" article.

"Deep Learning-Based Crack Damage Detection Using Convolutional Neural Networks" article.

"Image Based Techniques for Crack Detection, Classification and Quantification in Asphalt Pavement" article.

"GIS-based Automated Management of Highway Surface Crack Inspection System".

* cited by examiner

CRACK REGION
(SCORE MAP AFTER
THRESHOLDING PROCESS)

301

THINNING

302

POLYLINE
CONVERSION

SPECIFY INDIVIDUAL
REGION $L1 : 0 < L < L_{th1}$ $L2 : L_{th1} < L < L_{th2}$ $L3 : L_{th2} < L$

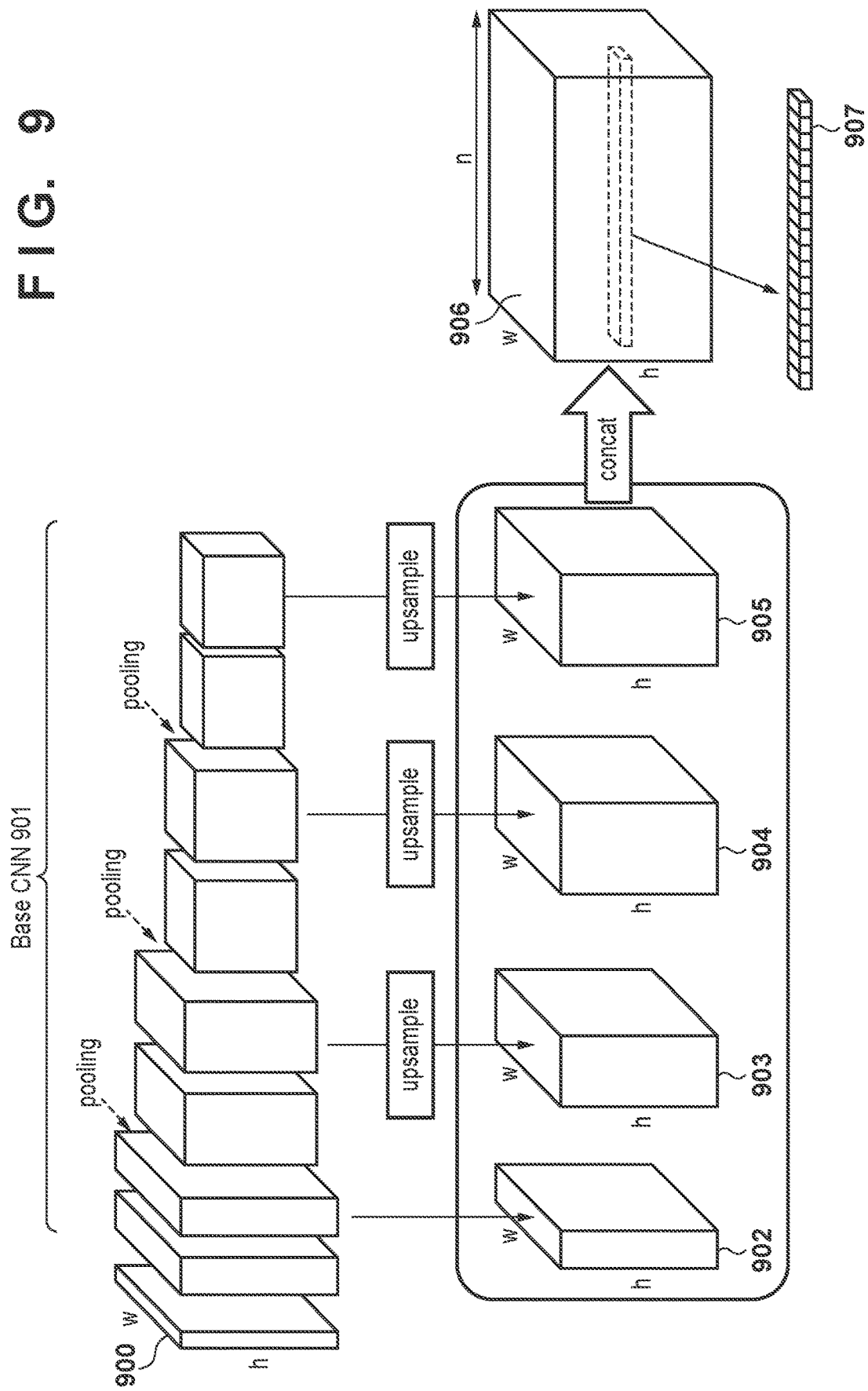

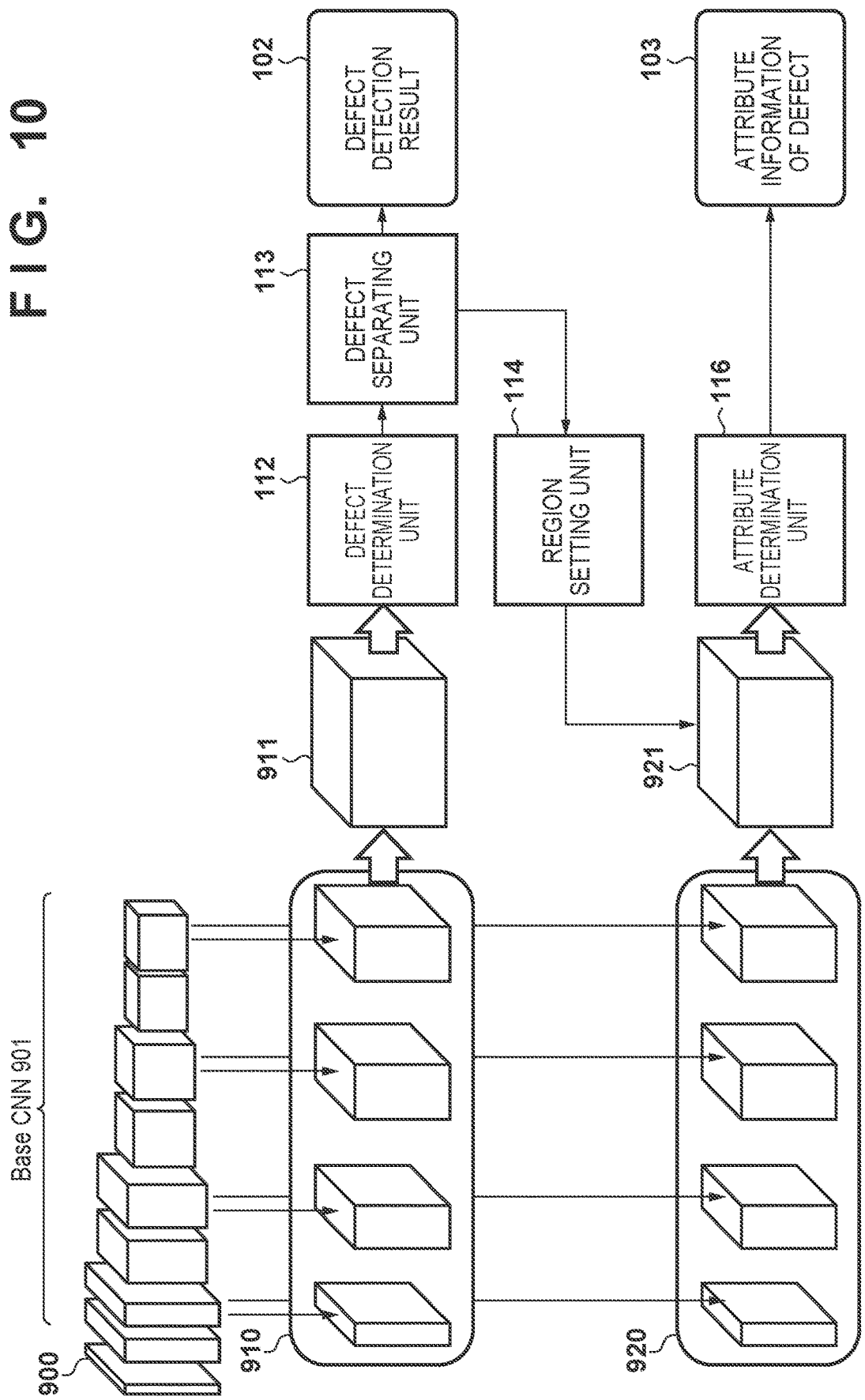

INFORMATION PROCESSING DEVICE, INFORMATION PROCESSING METHOD, AND STORAGE MEDIUM

CROSS REFERENCE TO RELATED APPLICATIONS

This application is a continuation of U.S. patent application Ser. No. 17/667,567 filed Feb. 9, 2022, which is a continuation of U.S. patent application Ser. No. 16/682,460 filed Nov. 13, 2019, U.S. Pat. No. 1,282,185 B2, which is a continuation of International Patent Application No. PCT/JP2018/019370, filed May 18, 2018, which claims the benefit of Japanese Patent Applications No. 2017-101142, filed May 22, 2017, and No. 2018-088863, filed May 2, 2018, all of which are hereby incorporated by reference herein in their entirety.

BACKGROUND OF THE INVENTION

Field of the Invention

The present invention relates to an information processing device, an information processing method, and a storage medium.

Description of the Related Art

Recently, techniques for automating inspections conventionally done by eye are being studied. For example, when inspecting concrete wall surfaces of bridges, dams, tunnels, and the like, the inspecting technician approaches the concrete wall surface and checks for anomalies such as cracks by eye. For such inspection work, known as "close-range visual observation", high working costs are incurred. A method for automatically detecting defects from a captured image of a concrete wall surface has therefore been proposed (Japanese Patent Laid-Open No. 2009-103720).

During inspections, it is desirable to not only detect whether or not a defect is present, but also determine the attributes of the defect. For example, when inspecting concrete for cracks, confirming the width of the crack makes it possible to determine the severity or level of danger posed by the crack. Japanese Patent Laid-Open No. 2009-103720 discloses a method for determining the width of a crack from an image. Specifically, a database which holds relationships between luminance distribution data of a local region centered on pixels representing a crack, and the width of the crack, is constructed. The luminance distribution data of the local region is obtained for each pixel in the image for detection and verified against the database, with a crack width unique to the most similar luminance distribution data being output as a result of determining the crack width. The width of the crack is determined by executing this process for each pixel in the crack.

However, when determining the width of the crack using image data of a local region as in Japanese Patent Laid-Open No. 2009-103720, there are situations where the crack is determined to be wider than it actually is. For example, a concrete surface may have peeled off (be chipped), or bubbles (pocks) may have formed in the concrete surface. If the luminance distribution of a local region in an area where there is chipping or a hole formed by a bubble is found for a crack passing through that part, the luminance distribution that is found is the same as if the crack were wide. In this case, if the width of the crack is determined through the same method as in Japanese Patent Laid-Open No. 2009-103720, the crack will be determined to be wider than it actually is. Furthermore, if the maximum crack width of a single crack is calculated on the basis of Japanese Patent Laid-Open No. 2009-103720, the maximum crack width may be calculated as being greater than it actually is, due to the influence of the crack width that has been determined to be greater than it actually is. Thus it has not been possible to accurately find the maximum crack width through the conventional method of determining the width of a crack using only image information from a local region.

The present invention makes it possible to improve the accuracy of determinations in a technique that determines the attributes of a defect of an object appearing in an image.

SUMMARY OF THE INVENTION

According to an embodiment of the present invention, an information processing device comprises: a defect detecting unit configured to detect a defect of an object in an input image; an extracting unit configured to extract a feature amount pertaining to a partial image of the defect from the input image, on the basis of a result of detecting the defect; and an attribute determining unit configured to determine an attribute of the defect using the feature amount pertaining to the partial image of the defect.

According to another embodiment of the present invention, an information processing device comprises: an obtaining unit configured to obtain the position of a defect in an input image along with attribute information of the defect; an extracting unit configured to extract a partial image of the input image including the defect, from a range defined in accordance with the position of the defect and extraction parameters; a training unit configured to train a classifier to return the attribute information of the defect when a feature amount pertaining to the extracted partial image is input; and an associating unit configured to associate information indicating a configuration of the classifier obtained from the training with the extraction parameters.

According to still another embodiment of the present invention, an information processing method comprises: detecting a defect of an object in an input image; extracting a feature amount pertaining to a partial image of the defect from the input image, on the basis of a result of detecting the defect; and determining an attribute of the defect using the feature amount pertaining to the partial image of the defect.

According to yet another embodiment of the present invention, a non-transitory computer-readable medium stores a program which, when executed by a computer comprising a processor and a memory, causes the computer to perform: detecting a defect of an object in an input image; extracting a feature amount pertaining to a partial image of the defect from the input image, on the basis of a result of detecting the defect; and determining an attribute of the defect using the feature amount pertaining to the partial image of the defect.

Further features of the present invention will become apparent from the following description of exemplary embodiments with reference to the attached drawings.

BRIEF DESCRIPTION OF THE DRAWINGS

The accompanying drawings, which are included in and constitute part of the specification, illustrate embodiments of the present invention, and along with those descriptions serve to illustrate the principles of the present invention.

FIG. 9 is a diagram illustrating a CNN used in a third embodiment.

FIG. 10 is a block diagram illustrating an example of the configuration of an information processing device according to the third embodiment.

DESCRIPTION OF THE EMBODIMENTS

Embodiments of the present invention will be described on the basis of the drawings. However, the scope of the present invention is not limited to the following embodiments.

First Embodiment

A first embodiment will describe an information processing device and an information processing method that detect a defect from an input image and furthermore determine attribute information of the detected defect. In the following embodiment, once the defect has been detected, attributes of the defect are determined using a feature amount pertaining to a partial image from the input image, which contains the defect. According to such a method, the attributes can be determined more accurately than when determining the attributes of the defect using only image information from a local region. For example, if the width of a crack is to be determined, deriving the width of the crack comprehensively from image information of a region along the crack makes it possible to calculate the maximum crack width more accurately than the conventional technique.

The input image used in the present embodiment is an image obtained by capturing an image of a structure, i.e., as an object. For example, the object may be a concrete structure such as a bridge, a dam, or a tunnel. Ultimately, the input image is an image of an object serving as an inspection subject that is to be inspected for a defect, and the type of the object is therefore not particularly limited. For example, the input image can be an image of asphalt on a road, the outer wall of a structure such as a building, or the like as well. Furthermore, the following describes a case where the input image is a visible light image (an RGB image). However, the type of the image is not limited, and the image may be a thermal image captured by an infrared camera, an image captured using a line sensor camera, or the like, for example.

In the present embodiment, a crack in a concrete wall surface is detected as the defect. The attribute information of the defect to be determined is the width of the crack. However, the defect to be detected and the attribute information to be determined are not limited thereto. For example, if the inspection subject is a concrete structure, the defect to be detected may be free lime deposition, flaking, cracking, honeycombing, cold joints, rebar exposure, or the like. When the defect to be detected is a crack, the attribute information to be determined may be information indicating the level of danger posed by the crack, the cause of the crack, or the like.

Figure 1:
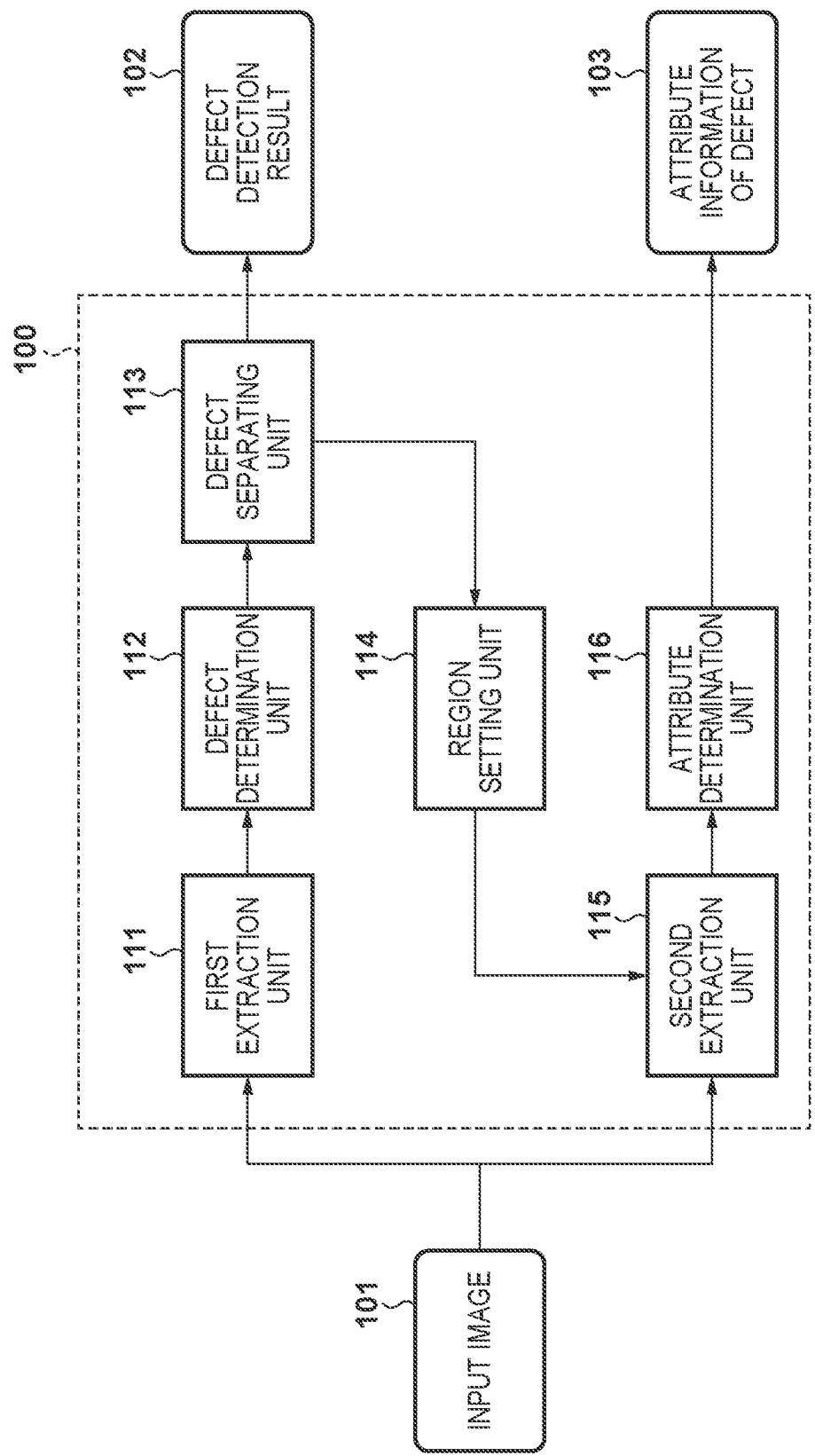
FIG. 1 is a block diagram illustrating an example of the configuration of an information processing device according to a first embodiment.
Figure 12:
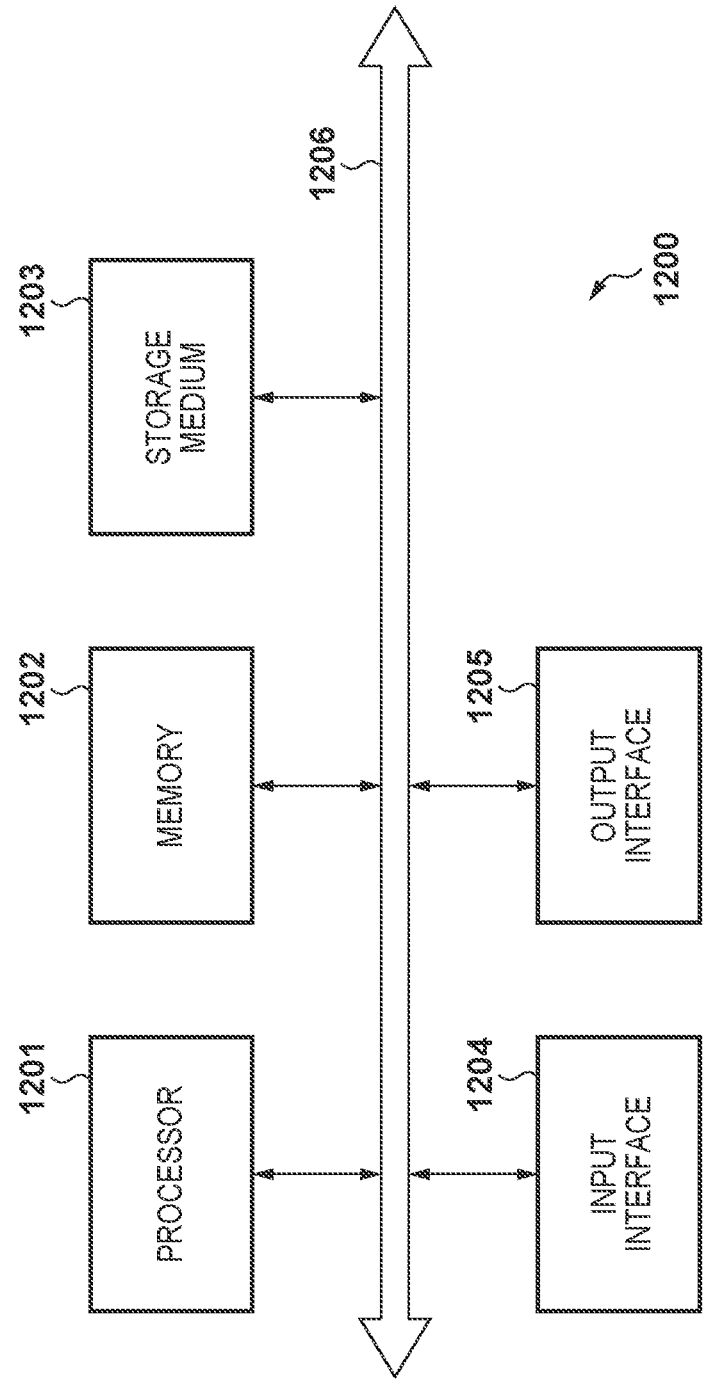
FIG. 12 illustrates an example of the configuration of a computer for implementing the processing according to the embodiments.

FIG. 1 is a diagram illustrating the configuration of an information processing device 100. The functions of the information processing device 100 are realized by a computer, which includes a processor and memory, executing software (programs) obtained over a network or from a recording medium. The computer may be a generic computer. For example, the computer illustrated in FIG. 12 can be used. A computer 1200, indicated in FIG. 12, includes a processor 1201 that carries out processing in accordance with programs, memory 1202 into which the programs are loaded, and a storage medium 1203 that stores the programs. The computer 1200 illustrated in FIG. 12 also includes an input interface 1204 to which an input device such as a mouse is connected, an output interface 1205 to which an output device such as a display device is connected, and a bus 1206. On the other hand, hardware designed for the information processing device 100 may be used as the computer.

Upon obtaining an input image 101, the information processing device 100 outputs a defect detection result (crack detection result) 102, which is a result of detecting a defect, and attribute information (a crack width) 103 of the defect. The information processing device 100 includes a first extraction unit 111, a defect determination unit 112, a defect separating unit 113, a region setting unit 114, a second extraction unit 115, and an attribute determination unit 116.

Figure 2:
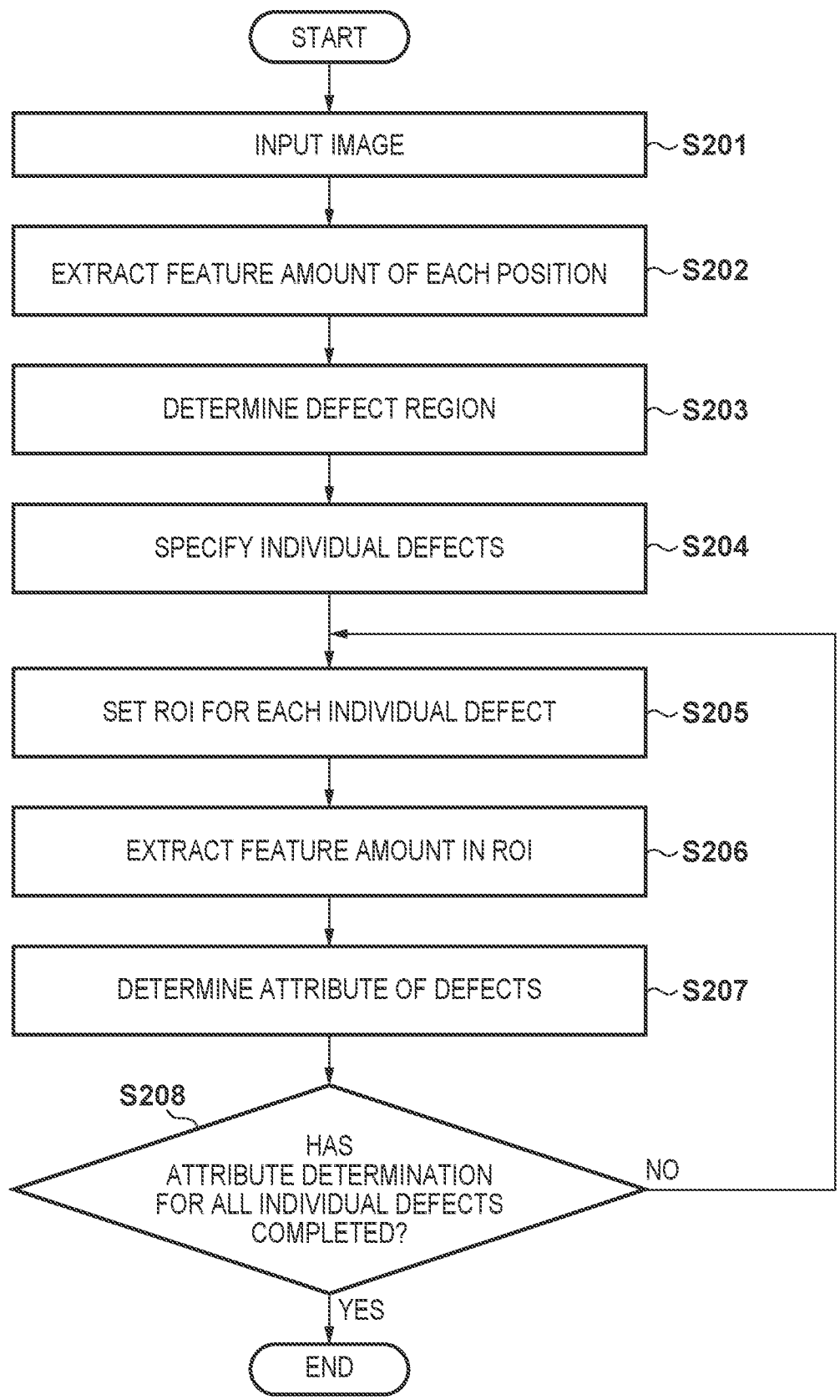
FIG. 2 is a flowchart illustrating processing according to the first embodiment.

FIG. 2 is a flowchart illustrating processing according to the first embodiment. The present embodiment will be described next with reference to FIGS. 1 and 2.

In step S201, the first extraction unit 111 obtains the input image 101. An object is visible in the input image. In the present embodiment, the object is a concrete wall surface, and the input image 101 is an image of the concrete wall surface. Additionally, a defect in the object may be visible in the input image 101 as well. In the present embodiment, the "defect" refers to a crack.

To simplify the following descriptions, the present embodiment assumes that the input image 101 has been processed as described hereinafter. First, the input image 101 is an image taken from directly opposite the concrete wall surface. Depending on the position or orientation of the image capturing device when the image of the structure is captured, it may not be possible for the image capturing device to capture an image from directly opposite the concrete wall surface, but such an image can be generated by carrying out a geometric conversion process on the image. It is also assumed that the input image 101 is subjected to processing for correcting lens distortion. Furthermore, it is assumed that the input image 101 is subjected to an enlargement or reduction process so that the image resolution is constant relative to the actual space. With these processes, for example, an image in which a single pixel corresponds to 1 mm of the concrete wall surface can be obtained. Such conversion and correction can be carried out by the information processing device 100 or an external device using known techniques, and will therefore not be described in detail.

In steps S202 and S203, a defect region in the input image 101 is determined. Any desired method, including known methods, can be used as the method for determining the defect region, in accordance with the type of a defect to be detected. For example, a region in which the color value differs from the average color value of the input image 101 by greater than or equal to a predetermined threshold can be determined to be a defect region. The following will describe a method that determines the defect region by extracting a feature amount from each of positions in the input image 101, and then classifies the feature amounts using a classifier, as a method suited to detecting a crack region. The feature amount extracted in this manner is a feature amount of a local region at a given position in the input image 101, and will therefore be called a "local feature amount" hereinafter.

In step S202, the first extraction unit 111 extracts an image feature amount for detecting a defect (crack) from the input image 101. The type of the feature amount is not particularly limited, and can be selected as appropriate from among options, including known techniques, in accordance with the characteristics of the defect to be detected. For example, when detecting a crack, a HOG (Histograms of Oriented Gradients) feature amount, in which the value changes where image edges are present, can be used. The HOG feature amount is a feature amount indicating the direction of a luminance gradient, and due to its association with image edges, is a feature amount relatively suited to the detection of cracks. In this case, the first extraction unit 111 extracts the HOG feature amount from a predetermined quadrangular region centered on a given pixel of interest in the input image 101, in order to extract the HOG feature amount for a pixel of focus. The first extraction unit 111 can extract the HOG feature amount for each pixel in the input image 101.

In step S203, the defect determination unit 112 detects a defect in the object appearing in the input image. In the present embodiment, the defect determination unit 112 determines whether or not each pixel in the input image 101 indicates a defect, on the basis of the feature amounts extracted in step S202. This determination algorithm can also be selected as appropriate from among options, including known techniques, in accordance with the characteristics of the defect to be detected and the type of feature amount.

In the present embodiment, the defect determination unit 112 carries out the determination as follows, using the HOG feature amount extracted in step S202 and an SVM (Support Vector Machine). First, the defect determination unit 112 calculates a score expressing the likelihood that the pixel of interest corresponds to a defect (a crack resemblance). For example, using the SVM, the distance of the HOG feature amount from an identification plane can be found, and that distance can be used as a score expressing the crack resemblance of the pixel of interest. By carrying out such processing on all the pixels in the input image, a score map expressing the score of each pixel can be obtained. When the score exceeds the predetermined threshold, that pixel can be determined to represent a defect (a crack). Specifically, by subjecting the score map to a thresholding process using the predetermined threshold, a region constituted by pixels having a high crack score can be specified as a defect region (a crack region).

Note that the SVM used by the defect determination unit 112 is assumed to have been trained in advance using HOG feature amounts extracted from images which are known to have cracks in the centers. Such SVM training can be carried out using a known method, and will therefore not be described in detail here.

The information processing device 100 may output the position of the defect region, which has been determined by the defect determination unit 112, as the defect detection result 102. Additionally, the attribute determination unit 116 may find the attribute information 103 of the defect, as will be described later, on the basis of the image of the defect region determined by the defect determination unit 112. However, in the present embodiment, processing is carried out by the defect separating unit 113 and the region setting unit 114 in order to obtain a more detailed defect detection result 102, and in order to obtain more detailed attribute information 103 of the defect.

In step S204, the defect separating unit 113 detects the position of the defect on the basis of the defect region detected in step S203. In the present embodiment, the defect separating unit 113 furthermore can individually detect a plurality of defects appearing in the input image 101. Specifically, the defect separating unit 113 can separate and identify the positions of two or more anomalies present in the defect region detected in step S203. In the present embodiment, where cracks are detected as the anomalies, this corresponds to a process of breaking down a defect (a crack) present in the defect region (the crack region) into individual anomalies (single-line cracks).

Figure 3A:
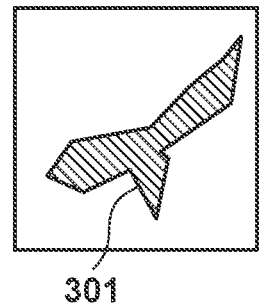
FIG. 3A is a diagram illustrating processing carried out by a defect separating unit.

FIGS. 3A to 3D are diagrams illustrating the processing carried out in step S204 in detail. The processing of step S204 includes a thinning substep, a polyline conversion substep, and a separating substep. These substeps will be described hereinafter. FIG. 3A illustrates a crack region 301 detected in step S203. The crack region 301 is a region constituted by pixels having a crack score greater than or equal to a predetermined threshold.

In the thinning substep, the defect separating unit 113 carries out a thinning process on the crack region 301. Specifically, the defect separating unit 113 thins the crack region to the width of a single pixel. This process makes it possible to identify the position of the crack. Any desired known algorithm can be used for the thinning process. The thinning process can be carried out by, for example, generating a binary image in which the crack region is 1 and the background is 0, and then applying a Hilditch algorithm.

To find the position of the crack more accurately, the defect separating unit 113 may carry out the thinning on the basis of the crack score calculated by the defect determination unit 112. As described above, the score map expresses scores indicating the crack resemblance for each pixel in the crack region 301. As such, by carrying out the thinning so that the thin lines pass through the positions where the score is at a peak, the defect separating unit 113 can carry out the thinning so that pixels having the highest likelihood of indicating a crack are included. NMS (Non-Maximal Suppression), which is used in the Canny method of edge detection processing, can be applied in this processing, for example. To apply the Canny method NMS in the present embodiment, the defect separating unit 113 can find the direction of the slope of the score for each pixel, and then carry out a process for leaving the pixels having the highest score in the direction of the slope (not leaving the pixels that do not have the highest score). Note, however, that the score map is unnecessary in an embodiment that does not carry out the thinning using NMS. Accordingly, the defect determination unit 112 may output a binary image in which the crack region is expressed by 1, and a background region is expressed by 0.

Figure 3B:
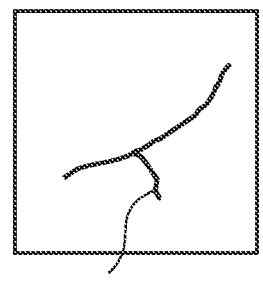
FIG. 3B is a diagram illustrating processing carried out by the defect separating unit.

As a result of the stated thinning substep, a crack region detection result 302 having a width of one pixel is derived, as indicated in FIG. 3B. The linear detection result 302 obtained as a result of the thinning can be called a line indicating the position of the crack. In the polyline conversion substep and the separating substep that follow thereafter, the defect separating unit 113 separates the lines obtained in this manner in accordance with directional changes in the lines. For example, a line can be divided at a location where the direction of the line changes by an amount greater than a threshold. Each of the lines obtained by this division indicates the position of an individual crack. In this manner, the defect separating unit 113 can individually detect a plurality of cracks appearing in the input image 101. A specific example of this processing will be described hereinafter.

In the polyline conversion substep, the defect separating unit 113 approximates the detection result 302 using a plurality of line segments. A line expressed by a plurality of line segments will be called a "polyline" hereinafter, and the process of generating a polyline will be called "polyline conversion". Converting a crack region that is one pixel wide into polylines makes it easier to determine individual crack regions (single-line crack regions), which will be described later. Additionally, saving the detected crack data as polyline data makes it easier to handle the crack data, by reducing the data amount, making it possible to easily calculate the length of each crack, and so on.

Figure 4A:
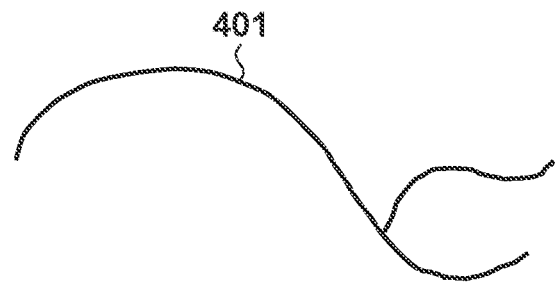
FIG. 4A is a diagram illustrating processing carried out by the defect separating unit.
Figure 4B:
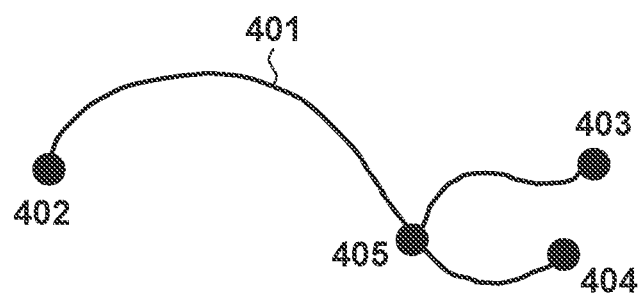
FIG. 4B is a diagram illustrating processing carried out by the defect separating unit.

Polyline conversion will be described using FIGS. 4A to 4E. First, a line 401 in FIG. 4A is the detection result from the crack region that has been thinned to a width of one pixel in the thinning substep. The defect separating unit 113 first detects endpoints 402, 403, and 404, and a branch point 405, in the line 401, as illustrated in FIG. 4B. In FIG. 4B, the branch point 405 is a point at which three lines branch. However, four or more lines may branch at the branch point.

Figure 4C:
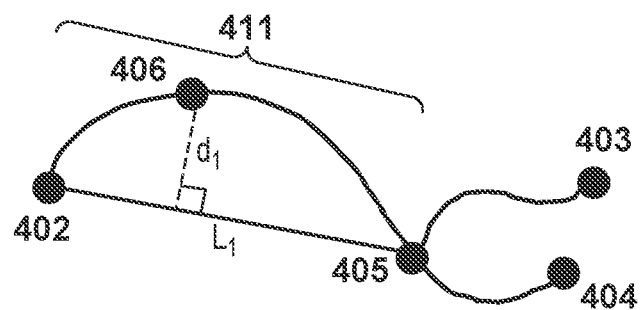
FIG. 4C is a diagram illustrating processing carried out by the defect separating unit.
Figure 4D:
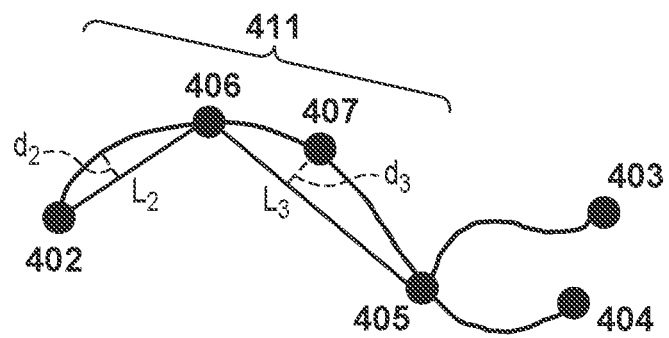
FIG. 4D is a diagram illustrating processing carried out by the defect separating unit.

Next, the defect separating unit 113 carries out the polyline conversion process on each line segmented by an endpoint or a branch point. FIGS. 4C and 4D illustrate the defect separating unit 113 carrying out the polyline conversion process on a line 411 between the endpoint 402 and the branch point 405. The algorithm used for the polyline conversion process is not particularly limited, but in the present embodiment, the Ramer-Douglas-Peucker algorithm is used. Processing using this algorithm will be described below.

First, a straight line $L_1$ is drawn so as to pass through the endpoint 402 and the branch point 405. Next, a point 406 on the line 411, which is furthest from this straight line $L_1$, is found, and a distance $d_1$ between the point 406 and the straight line $L_1$ is then found. If the distance $d_1$ is greater than a predetermined distance $\varepsilon$, the point 406 is added as a point constituting the polyline.

In this case, the polyline conversion process is carried out recursively on both the line between one end of the line 411 (the endpoint 402) and the newly-added point 406, and between the other end of the line 411 (the branch point 405) and the newly-added point 406. For example, as illustrated in FIG. 4D, a straight line $L_2$ connecting the point 402 and the point 406, the furthest point from the straight line $L_2$ on the line between the point 402 and the point 406, and a distance $d_2$ between that point and the straight line $L_2$ are found in sequence. The distance $d_2$ is then compared to $\varepsilon$. Likewise, a straight line $L_3$ and a distance $d_3$ are found for the line between the point 406 and the point 405, and the distance $d_3$ is compared to $\varepsilon$. In the case illustrated in FIG. 4D, $d_2$ is lower than $\varepsilon$, and thus the processing ends without a polyline point being added between the point 402 and the point 406. On the other hand, $d_3$ is greater than $\varepsilon$, and thus the point 407, which is furthest from the straight line $L_3$, is added on the line between the point 406 and the point 405. Then, the polyline conversion process is furthermore carried out between the point 406 and the point 407, and between the point 407 and the point 405.

As described above, polyline conversion is carried out on the line 411 between the endpoint 402 and the branch point 405. By executing this polyline conversion process on the lines between one endpoint and another endpoint, between one endpoint and a branch point, and between one branch point and another branch point, a polyline indicating a crack is obtained, expressed by line segments passing through the points 402 to 409 as indicated in FIG. 4E.

Figure 3C:
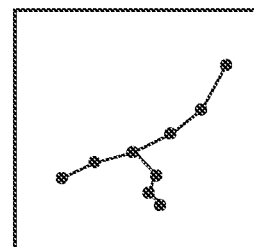
FIG. 3C is a diagram illustrating processing carried out by the defect separating unit.
Figure 3D:
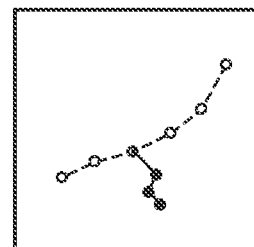
FIG. 3D is a diagram illustrating processing carried out by the defect separating unit.

The defect separating unit 113 obtains the polyline indicated in FIG. 3C through the processing described above. In the final separating substep, the defect separating unit 113 specifies single-line cracks from the polyline indicating the crack. For example, FIG. 3D indicates the result of determining the crack expressed by the polyline in FIG. 3C as two individual cracks. A process through which the defect separating unit 113 specifies the range of a single crack in this manner will be described with reference to FIGS. 4E to 4F.

Figure 4E:
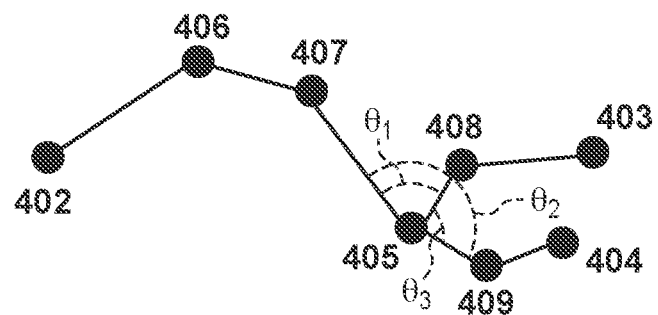
FIG. 4E is a diagram illustrating processing carried out by the defect separating unit.

FIG. 4E indicates a crack expressed by a polyline, as described earlier. Three cracks branch from the branch point 405, and two of those cracks may be taken as being a single continuous crack. The defect separating unit 113 determines whether or not to consolidate two of the three or more cracks branching from the branch point. Specifically, in the example illustrated in FIG. 4E, three polylines are present, namely (1) the polyline connecting the endpoint 402 and the branch point 405, (2) the polyline connecting the endpoint 403 and the branch point 405, and (3) the polyline connecting the endpoint 404 and the branch point 405. To specify the range of a single crack, the defect separating unit 113 determines which of the polylines passing through the branch point 405 to combine, so as to treat the cracks as a single crack.

In the present embodiment, the defect separating unit 113 specifies a single crack by calculating the angle between polylines at the branch point 405 and then connecting the combination of polylines at which the angle between the polylines is less sharp. The method used in the present embodiment is based on the knowledge that drastic directional changes do not arise in a single continuous crack. This process will be described in detail using FIGS. 4E and 4F.

In FIG. 4E, the defect separating unit 113 calculates an angle $\theta_1$ between the polyline connecting the endpoint 402 and the branch point 405, and the polyline connecting the endpoint 403 and the branch point 405. In the present embodiment, the defect separating unit 113 uses the points on each polyline that are closest to the branch point 405 (the point 407 and the point 408), and finds the angle formed by the point 407, the branch point 405, and the point 408 as the angle $\theta_1$. Likewise, the defect separating unit 113 finds angles $\theta_2$ and $\theta_3$ for the remaining combinations of the polylines with respect to the branch point 405, as indicated in FIG. 4E. Note that the method of calculating the angles between the polylines is not limited to this method. For example, the defect separating unit 113 may take an angle formed by line segments connecting the starting points and ending points of each of polylines as the angle between the polylines. For example, the angle formed by a line segment connecting the point 402 and the point 405 and a line segment connecting the point 403 and the point 405 may be calculated as the angle between the polyline connecting the endpoint 402 and the branch point 405 and the polyline connecting the endpoint 403 and the branch point 405.

Figure 4F:
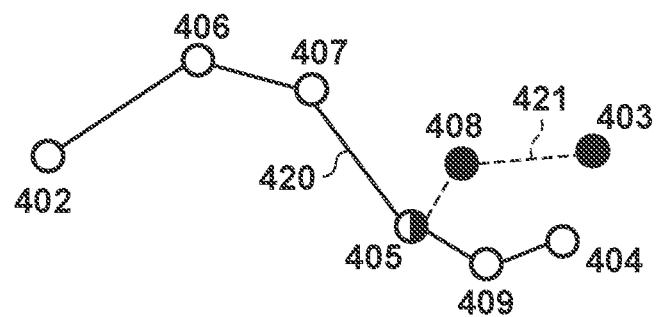
FIG. 4F is a diagram illustrating processing carried out by the defect separating unit.

The defect separating unit 113 finds the angle, among the angles between the polylines calculated as described above, that is the least sharp. For example, if the range of the angle $\theta_n$ between polylines is represented by $0<\theta_n\leq\pi$, the defect separating unit 113 selects the combination of polylines at which the angle is the greatest. In FIG. 4E, $\theta_2$ is the greatest among $\theta_1$, $\theta_2$, and $\theta_3$. $\theta_2$ is the angle between the polyline extending from the endpoint 402 to the branch point 405 and the polyline extending from the endpoint 404 to the branch point 405, and these polylines are therefore connected and handled as a single crack. FIG. 4F illustrates the range of two cracks determined through the processing described above. In other words, the crack indicated by the polylines in FIG. 4E is separated into a single crack 420 expressed by the white circles and the solid lines, and a single crack 421 expressed by the black circles and the broken lines. The point 405 is indicated by both white and black to show that it is a part of both the cracks 420 and 421.

The foregoing has described a process in which the angles between polylines at a branch point are compared, and the polylines are combined and taken as a single crack. In the separating substep, the defect separating unit 113 may furthermore carry out a process for determining the range of a single crack by taking into account directional changes within the polylines. As described above, drastic directional changes do not often arise in a single continuous crack. Accordingly, when the direction of the polyline drastically changes at a given point, the polyline can be divided at that point and handled as two separate cracks. Specifically, the defect separating unit 113 can calculate the angle formed by the polyline at each point along the polyline, and can divide the polyline at a point in the case where the angle is smaller than a predetermined threshold.

Figure 5A:
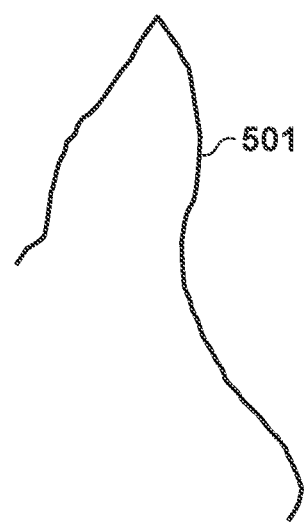
FIG. 5A is a diagram illustrating processing carried out by the defect separating unit.
Figure 5B:
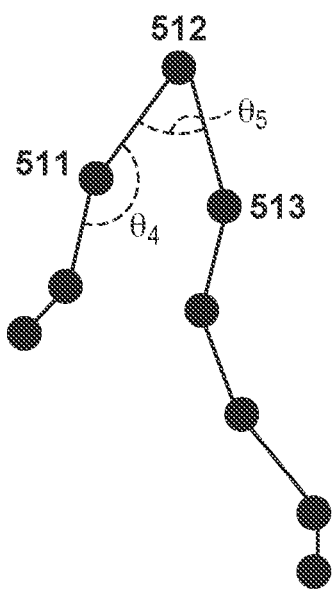
FIG. 5B is a diagram illustrating processing carried out by the defect separating unit.
Figure 5C:
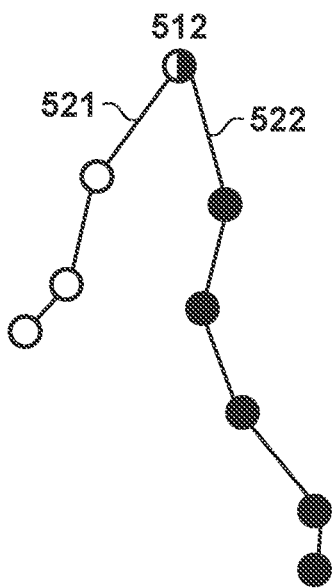
FIG. 5C is a diagram illustrating processing carried out by the defect separating unit.

This process will be described using FIGS. 5A to 5C. Here, it is assumed that a line 501 has been obtained as a result of the thinning, as indicated in FIG. 5A, and that the polylines indicated in FIG. 5B have been obtained through the polyline conversion. First, the defect separating unit 113 calculates the angles formed by the polylines at each of the points along the polylines. For example, the angle at the point 511 is $\theta_4$. The defect separating unit 113 compares the angle $\theta_n$ at each point with a pre-set angle $\theta_{th}$, and divides the polyline at that point when $\theta_n<\theta_{th}$. FIG. 5B illustrates an example in which the angle $\theta_5$ at a point 512 corresponds to $\theta_5<\theta_{th}$. In this case, the defect separating unit 113 divides the single crack represented by the line 501 into a crack 521 and a crack 522 so that the point 512 serves as the boundary between the two cracks, as illustrated in FIG. 5C.

The angle $\theta_{th}$ can be set experientially by a user, to an angle assumed to not be present in a single crack. As another setting method, the angle $\theta_{th}$ can be found statistically by preparing a sufficient amount of polyline crack data that has been confirmed by humans. In this case, information indicating the angle at each point along the polyline, as well as information indicating whether each point was determined to be a crack division point or a crack continuing point by a human, is collected. The angle $\theta_{th}$ at the threshold at which a division point and a continuing point can be best determined is then found. The angle which provides the best determination can be found using a known method, such as discriminant analysis. Further, if a sufficient amount of angle data at the points determined to be division points cannot be collected, the determination standard can also be set using only angle data at points determined to be continuous points. For example, an angle corresponding to $3\sigma$ under a normal distribution can be found using an angle data distribution at the point determined to be a continuous point, and that angle can be used as $\theta_{th}$.

As described above, in step S204, the defect separating unit 113 specifies each defect (a single-line crack) from the defect region (the crack region) detected in step S203. Note that even when detecting anomalies other than cracks, individual defects can be specified through an appropriate method based on the nature of the defect. For example, when detecting concrete pop-out, two or more defects can be detected from a defect region using pattern matching.

The processing from steps S205 to S208 will be described next. The processing from steps S205 to S208 are carried out for the defect (the crack) detected leading up to step S204. If two or more defects have been detected leading up to step S204, the processing from steps S205 to 207 is carried out consecutively for each defect. In other words, a single defect is selected, and the processing from steps S205 to S207 is carried out for the selected defect. In step S208, it is determined whether or not there is a defect for which the processing has not yet been executed. If there is a defect for which the processing has not yet been executed, that defect is selected, and the processing from steps S205 to 207 is carried out.

The processing of step S205 will be described first. The region setting unit 114 sets a region to be used for calculating the attribute information of the defect. In step S206, a feature amount is calculated for the region that has been set in this manner. This region is an image region including the defect, and will be called an ROI (Region of Interest) hereinafter. To be more specific, the region setting unit 114 sets the region (ROI) of a partial image of the defect extracted from the input image 101, in accordance with the position of the defect detected leading up to step S204. This setting method can be selected as appropriate in accordance with the type of the defect to be detected.

For example, the region setting unit 114 can set a pixel group, which corresponds to the position of the defect detected leading up to step S204, as the ROI. In the present embodiment, a polyline expressing a single defect (a single crack) has been obtained in step S204. Accordingly, the region setting unit 114 can set a pixel group through which this polyline passes as the ROI.

Figure 6:
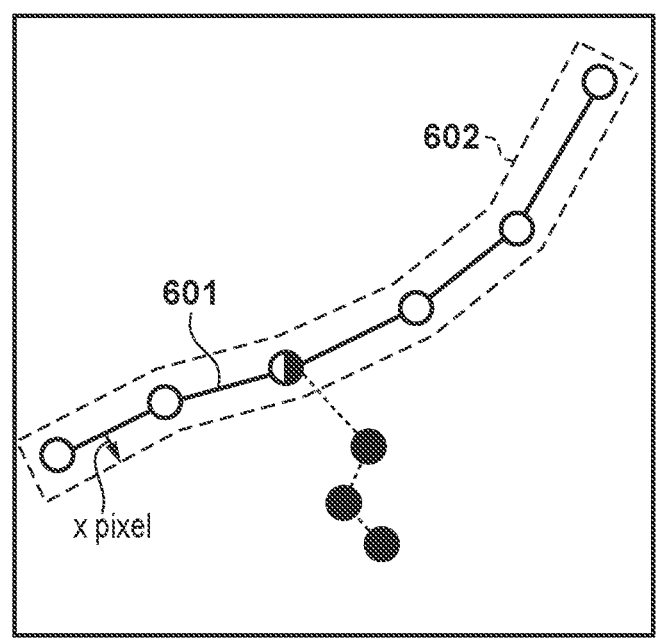
FIG. 6 is a diagram illustrating processing carried out by a region setting unit.

The ROI may be larger than the region constituted by the pixel group corresponding to the position of the defect, and can, for example, be set by carrying out a process for enlarging that region. A specific example of the method for setting the ROI when detecting a crack as the defect will be described with reference to FIG. 6. In FIG. 6, a region within a range of x pixels from a crack is set as an ROI 602 for a single crack 601 expressed by white circles and solid lines. The parameter x is a numerical value set in advance, and for example, x can be set to 5 pixels. Thus in the present embodiment, the ROI is an image region surrounding the crack, centered on the position of the crack.

Setting the ROI to a region broader than the defect in this manner makes it possible to improve the accuracy at which the attribute information of the defect is determined. This makes it possible to reduce the likelihood that the crack will be determined to be wider than it actually is in situations where, for example, the concrete surface at the area of the crack has peeled away (is chipped), or the crack passes through a hole that has formed in the concrete surface for some reason. This also makes it easier to determine the correct crack width, even if the detected position of the crack, e.g., the result of the polyline conversion, is shifted by several pixels from the actual position of the crack.

The processing of step S206 will be described next. In step S206, the second extraction unit 115 extracts a feature amount from the ROI. Specifically, the second extraction unit 115 extracts an image feature amount from an image in the ROI within the input image. This feature amount will be called a "defect feature amount" hereinafter. The method for extracting the feature amount can be selected as appropriate in accordance with the defect to be detected and the type of the attribute information.

In one embodiment, a feature amount having a constant dimension regardless of the size of the ROI (e.g., the length of the crack) is used to make the process for calculating the attribute information, carried out in step S207, easier. In the present embodiment, the second extraction unit 115 extracts a histogram feature amount from the image of the ROI in order to extract a feature amount having a predetermined dimension regardless of the size of the ROI. Specifically, on the basis of the pixel values of the pixels, the second extraction unit 115 generates a histogram of all the pixels present in the ROI, in accordance with a pre-set bin (i.e., a plurality of numerical value ranges). A histogram feature amount expressed by a number of pixels for each bin can then be obtained. In this case, the number of bins corresponds to the dimensions of the feature amount, and thus the histogram feature amount always has the same number of dimensions regardless of the size of the ROI. Note that the pixel values may be normalized on the basis of a maximum value or the like in order to simplify the processing carried out in step S207. Any desired values expressing color information can be used as the pixel values. For example, luminance values in grayscale images, average color values in color images, Y values in the YUV color space, and so on can be used. Additionally, the pixel information used to create the histogram feature amount is not limited to pixel values. For example, the histogram feature amount may be found by finding a gradient direction of the pixel value for each pixel and then creating a histogram of the gradient directions.

Additionally, the second extraction unit 115 may generate the histogram feature amount using only some of the pixels in the ROI, rather than using all of the pixels in the ROI. For example, every other pixel may be selected from the pixels in the ROI, and the histogram may then be generated using the selected pixels. Furthermore, as a different method for generating the histogram feature amount, the second extraction unit 115 may extract a histogram feature amount using a method known as BoW (Bag of Words) or BoF (Bag of Features). In this case, a plurality of visual words are generated from multiple ROIs in advance, and the frequency with which the visual words appear in the ROI image to be processed can then be converted to a histogram. Generating histogram features using BoW or the like can be carried out according to known techniques, and will therefore not be described in detail here.

A defect feature amount v for determining the attribute information for a single defect is obtained through the above-described processing. As described above, the defect feature amount differs from the local feature amount, which is found from the region around a single pixel, in that the defect feature amount is calculated using the information of each of the pixels in the ROI. In the present embodiment, the defect feature amount is calculated using a different method from the local feature amount.

In step S207, the attribute determination unit 116 determines the attribute information of the defect using the defect feature amount v, e.g., the above-described histogram feature amount, extracted from the partial image of the defect. The attribute determination unit 116 can determine the attributes for each of a plurality of defects. Although the method of determining the attributes using the feature amount is not particularly limited, the present embodiment will describe a method in which multi-class classification is used. In other words, it is determined which of a plurality of classes the attributes of a defect belongs to, using a classifier which has been trained in advance and which provides classes corresponding to feature amounts.

The following will describe a situation where the width of a crack is determined in particular. To determine the width of a crack using multi-class classification, ranges (classes) of a plurality of crack widths are set in advance. For example, a width of less than 0.5 mm can be set to class 1; greater than or equal to 0.5 mm and less than 1.0 mm, to class 2; greater than or equal to 1.0 mm and less than 2.0 mm, to class 3; and greater than or equal to 2.0 mm, to class 4. The crack width classes are not limited to these numerical values, and the segments can be set as desired. The attribute determination unit 116 determines which range (class) the width of a given crack corresponds to.

The attribute determination unit 116 makes the determination using a classifier F which takes the defect feature amount v as an input and outputs a class label c.

$$c = F(v)$$

If $c=2$ has been determined as a result, for example, the crack width is determined to be "greater than or equal to 0.5 mm and less than 1.0 mm", i.e., class 2. This determination result is the attribute information 103 of the defect output by the information processing device 100.

The attribute determination unit 116 can determine the attributes of the defect from the defect feature amount extracted from the partial image of the defect, using the classifier F trained in the manner described below. The following training process can be carried out by a training unit (not shown) included in the information processing device 100, or by an information processing device (not shown) operating as a separate training device. Such a training device can be realized using the computer 1200 illustrated in FIG. 12, for example.

Figure 7A:
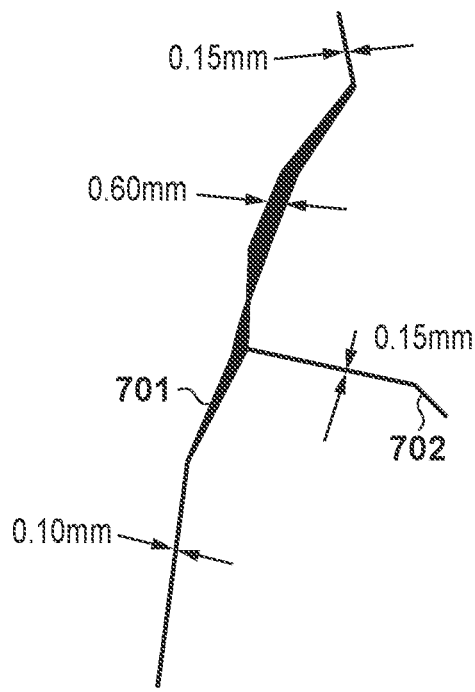
FIG. 7A is a diagram illustrating training data used for training a classifier.
Figure 7B:
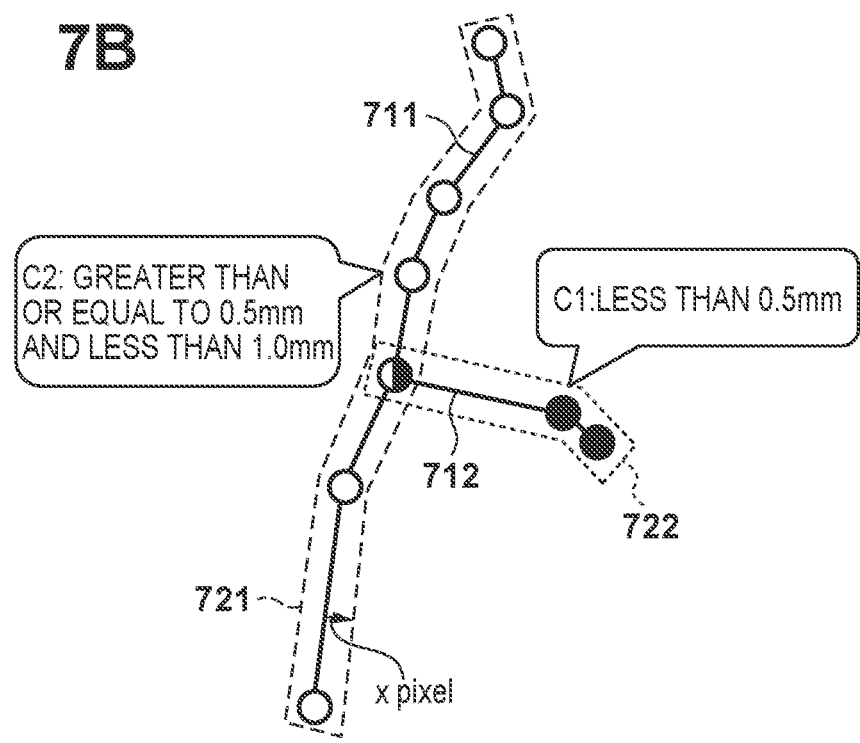
FIG. 7B is a diagram illustrating training data used for training a classifier.

The classifier F is trained in advance using feature amount data in which crack widths have been provided as supervisory data (labels indicating correct classes). FIGS. 7A and 7B are diagrams illustrating the data used to train the classifier F. FIG. 7A illustrates an image including a single crack 701, as well as a single crack 702 branching from that crack. In a crack that is greater than or equal to a predetermined length, the width of the crack tends to differ depending on the position, rather than the width of the crack being constant. For example, the crack 701 in FIG. 7A has a part that is 0.15 mm wide, a part that is 0.60 mm wide, and a part that is 0.10 mm wide. The widest part of the crack (the maximum crack width) is essential when determining the severity of the crack, and thus in the present embodiment, the maximum crack width is determined for that single crack. Note that the image data illustrated in FIG. 7A is assumed to have been subjected to enlargement/reduction processing or the like, in the same manner as in step S201.

The training data for training the attribute information (the maximum crack width) will be described next. The training data includes the image of a crack and supervisory data including class labels for crack widths. Such training data can be prepared as follows. First, a human views the crack image indicated in FIG. 7A, and enters information of the position and width of the crack. FIG. 7B is a diagram illustrating a method for entering this information. As illustrated in FIG. 7B, the human enters the position of the crack indicated in FIG. 7A. For example, the creator of the data can specify the pixels at which a single crack is located, and can specify the pixels at which a different crack is located. As another method which can reduce the workload involved in entering the information, the person entering the data can enter the positions of respective cracks as polylines 711 and 712 by entering a point 730 and the like so as to approximate the crack using line segments. Next, the person entering the data applies a label, which indicates the maximum crack width, to each of the cracks. For example, the maximum crack width of the crack 701 in FIG. 7A is 0.60 mm, and thus the person applies a class label C2 indicating "a crack width greater than or equal to 0.5 mm and less than 1.0 mm". The width of the crack 702 is 0.15 mm, and thus the person enters a class label C1 indicating "a crack width of less than 0.5 mm". In this manner, an obtainment unit of the training device obtains the position of a defect (a crack) in the input image (an image of a crack), as well as attribute information (the maximum crack width) of the defect.

As a result, a large amount of data (FIG. 7B) is prepared, including images of cracks (FIG. 7A) and class labels for crack positions and crack widths. Then, on the basis of this data, a set including an image feature amount and a class label is prepared for a single crack, and the classifier F is trained using this set so as to determine a crack width. The image feature amount for the single crack can be extracted in the same manner as in steps S205 and S206. An extraction unit of the training device extracts a partial image of the input image including the defect from a range (the ROI) defined according to the position of the defect (the position of the crack) and extraction parameters (x). Specifically, an ROI 721 is set to a range of x pixels surrounding the crack on the basis of the crack position indicated by a polyline 711 in FIG. 7B. The image feature amount v is then extracted from the image of the range corresponding to the ROI, in the image of the crack (FIG. 7A). The following data V is obtained when this process for extracting image feature amounts is carried out on each of the cracks included in the large number of crack images that have been prepared. Additionally, as described above, the following data V indicating the class labels of the cracks is obtained as well.

$$V = \{v_1, v_2, \ldots, v_m, \ldots, v_n\}$$

$$C = \{c_1, c_2, \ldots, c_m, \ldots, c_n\}$$

Here, n is the total number of cracks in all of the crack images for which positions have been entered by the person entering the data, $v_m$ is the image feature amount of the mth crack, and $c_m$ is the class label indicating the width of the mth crack. Data including n number of sets, each set including the image feature amount and the class label indicating the crack width, is prepared in this manner.

Using this data set, the classifier F is trained to determine the class (the crack width) when an image feature amount is entered. In other words, the training unit of the training device trains the classifier to return attribute information (c) of a defect when the feature amount of an extracted partial image (the image feature amount v) is taken as an input. The classifier may use any classification method as long as multi-class classification can be carried out. For example, the one-versus-the-rest method can be used, using an SVM. The Randomized Tree or k approximation methods can be used as well.

The parameters x used by the training device to extract the image feature amount v can be used in the ROI setting carried out by the second extraction unit 115. Thus in one embodiment, an association unit of the training device can associate information indicating the configuration of the classifier obtained through the training (e.g., the classifier parameters) with the extraction parameters x. The training device may hold this associated information, or may supply the information to the second extraction unit 115.

In step S208, the attribute determination unit 116 determines whether or not a crack for which the width has not yet been determined remains. If such a crack remains, the process returns to step S205. In this case, another crack is selected, and the width of that crack is determined. The process illustrated in FIG. 2 ends once the widths have been determined for all the cracks.

The information processing device 100 can obtain the defect detection result 102 as described above. The information processing device 100 can output the defect detection result 102, and the method thereof is not limited. For example, the information processing device 100 can display the position of the detected defect (e.g., the position of the crack) over the input image 101 in a display device (not shown). At this time, the display can be carried out so that individual cracks can be distinguished from one another, in accordance with the result of the processing by the defect separating unit 113.

The information processing device can also obtain the attribute information 103 of the defect as described above. The information processing device 100 can output the attribute information 103 of the defect, and the method thereof is not limited. For example, the information processing device 100 can allow a user to browse the attribute information of the defect by displaying the attribute information in a display device (not shown). As one example of a method for this display, the position of the detected defect (e.g., the position of the crack) can be displayed over the input image 101, and the determined attribute information (e.g., the crack width) can be displayed in the vicinity thereof. As another example, a line-shaped marker indicating the crack can be displayed over the input image 101, and the color or thickness of the marker can be changed in accordance with the determined attribute information (e.g., the crack width). As yet another example, if the user has selected a crack using a mouse cursor or the like, information of the crack width can also be displayed using a pop-up display or the like, and information of the crack width can be displayed when the user instructs properties of the crack to be displayed. Furthermore, the information processing device 100 may indicate, to the user, which range of image information in the input image was used to determine the crack width. In this case, the ROI range can be displayed over the image for each of the cracks. In this manner, a display unit (not shown) of the information processing device 100 can cause the display device to display the result of detecting a defect, the attributes of the defect, and information indicating the position of the partial image (ROI) of the defect.

The information processing device may also output the reliability of the attribute information determination. For example, the attribute determination unit 116 can output the determined attribute information along with the reliability of the determination. In this manner, the reliability of the attribute information determination can be displayed to the user. In this case, when the attribute information is determined using an SVM as the classifier, the reliability of the determination is a distance of the defect feature amount from the identification plane. However, the reliability is not limited thereto, and may be a likelihood, a probability, or the like, for example. A suitable indicator corresponding to the algorithm of the classifier can be used as the reliability. Displaying this reliability in the display device along with the aforementioned attribute information makes it possible for the user to confirm the certainty of the determined attribute information.

The method of displaying the reliability is not particularly limited. For example, the reliability (e.g., a numerical value indicating the reliability) can be displayed as a pop-up along with the attribute information. If the crack is expressed as a line-shaped marker, the reliability of the determination can also be expressed using a line-shaped marker. For example, the width of the crack can be expressed by the color of the line-shaped marker, while the reliability of the determination can be expressed by the darkness or lightness of the line-shaped marker.

Furthermore, a defect may be displayed with emphasis when the reliability of the attribute information of the defect is less than or equal to a predetermined value. For example, with a method that displays a pop-up prompting the user to confirm the position of the defect, displays a flashing marker indicating the defect displayed over an image, or the like, the defect can be displayed in an emphasized format to draw attention to the defect when it has a low reliability for the attribute information. According to this configuration, it is easier for the user to notice a determination result having a low reliability. This also makes it easy for the user to confirm the determination result, and make corrections as necessary, when the determination result has a low reliability.

According to the method of the present embodiment, when determining attribute information for a single defect, the determination is carried out on the basis of a broader range of an image. For example, when determining the thickness of a crack, the width of the crack can be determined on the basis of the overall feature amount of the single crack. As such, even if the crack appears wide at certain locations, the width of the crack can be determined without being significantly affected by the influence of that appearance.

Variation

A variation on the first embodiment will be described next. The following variation may also be applied in the second to fourth embodiments.

In the first embodiment, crack widths are classified into a plurality of classes, and the width of the crack is determined by finding the class of that crack width. As another embodiment, the crack width may be determined as an actual numerical value through regression analysis. In this case, the attribute determination unit 116 can use a regression model as the classifier F. Additionally, the image feature amount of the ROI of the crack region is used as the explanatory variable, while the actual numerical value of the maximum crack width is used as the objective variable. The training can be carried out using a set of the feature amount from a single crack image, and the maximum crack width for the crack entered as an actual numerical value. A method such as SVR (Support Vector Regression), Random Forest, k approximation, a neural network, or the like can be used for the regression model.

In the first embodiment, the maximum crack width is determined as the attribute information of the crack width. However, the attribute information of the crack (the defect) subject to the determination is not limited thereto. For example, an average crack width, a level of danger, the cause of the crack, or the like may be determined instead. The attribute information to be determined can be changed by preparing the attribute information to be determined as the supervisory data (label) instead of the maximum crack width.

Additionally, the attribute determination unit 116 may verify the defect detection result from steps S202 to 204 using the attribute determination process. For example, a class indicating that the defect has been false positive can be included in the plurality of attribute information classes determined by the attribute determination unit 116. Specifically, a class "false positive" can be added to the crack width classes determined by the attribute determination unit 116. If the class of the defect (e.g., the crack) determined by the attribute determination unit 116 is "false positive", the attribute determination unit can determine that that the defect has been false positive. In this case, the attribute determination unit 116 can delete the detection result for that defect, e.g., can control the display so that the detection result for that crack is not displayed in the display device (not shown). To carry out such verification, the classifier can be trained in the following manner. That is, the training can be carried out using a set of a feature amount extracted from an ROI set to a part of the image unrelated to the defect and a label "false positive", in addition to the set of the feature amount of the defect and the class label indicating the attribute information of the defect prepared as described above. With this method, when a feature amount for an image unrelated to the defect has been entered, i.e., when the defect has been false positive, the classifier can determine that the defect is an "false positive".

In the first embodiment, the input image is corrected in advance so that a single pixel corresponds to 1 mm. However, the input of images having different resolutions may be accepted as well. In this case, a classifier selected in accordance with the resolution can be used. For example, a classifier for detecting a crack and a classifier for determining the crack width are trained using training data having a first resolution. Classifiers are trained in the same manner using training data having a second resolution. In this manner, classifiers can be prepared in accordance with the resolution, e.g., a classifier for a resolution in which a single pixel corresponds to 1 mm, a classifier for a resolution in which a single pixel corresponds to 0.5 mm, or the like. The crack can be detected, and the crack width can be determined, while switching the classifier in accordance with the resolution of the input image. The resolution of the input image may be explicitly entered by the user, or the resolution may be automatically estimated from the input image. A method in which the resolution is estimated on the basis of the size of a reference object in the input image can be given as a method for automatically estimating the resolution. A crack scale or the like, for example, can be used as the reference object. When a classifier is selected automatically or manually in accordance with the resolution in this manner, the classifier that has been selected can be displayed in the display device (not shown). In this case, the resolution corresponding to the selected classifier, the name of the classifier, an ID of the classifier, or the like can be displayed.

Additionally, in this case, the accuracy at which the attributes are determined can be improved by changing the parameters x (FIG. 6 or FIG. 7B), which are used to determine the range of the ROI, in accordance with the resolution of the input image. In the above-described example, the parameters x express the number of pixels with the defect on their center, and thus it is necessary to change the parameters x in accordance with the resolution in order to use the same part of the detection target as the ROI when the resolution of the input image changes. Accordingly, parameters x suited to each of the classifiers prepared for corresponding resolutions are stored, and the ROI can then be set on the basis of the parameters x during training, classification, and so on. In this case, displaying the range of the ROI in the image for each crack as described earlier makes it possible for the user to easily understand from which range the defect feature amount has been extracted. The parameters x that have been used may be displayed in the display device as well.

As described earlier, the detected defect and the determined attribute information are not limited to a crack and the width of the crack, respectively. For example, free lime deposition, flaking, cracking, honeycombing, cold joints, rebar exposure, or the like can be given as examples of anomalies to be detected even when only inspecting wall surfaces. The level of danger of the detected defect, the cause of the defect, and the like can be given as examples of the attribute information to be determined. The feature amount described above for the case where cracks are to be detected may be used as the feature amount used when detecting such anomalies and determining the attributes, or feature amounts suited to each type of defect may be extracted separately. Of course, the example to which the method of the present embodiment is applied is not limited to wall surface inspections, and can be applied in any desired defect detection.

In the first embodiment, the crack is divided into individual cracks, and the width of each of those cracks is then detected. However, the method for separating the cracks is not limited to this method. For example, each segment of a polyline separated by branch points may be handled as a single crack, and the attribute information may be calculated for each crack between an endpoint and a branch point, and between one branch point and another branch point, of the polyline. Additionally, a line (a single line segment) between points constituting the polyline may be handled as a single crack, and the attribute information thereof may be calculated.

Furthermore, the information processing device 100 may include a separate configuration for detecting anomalies such as holes, peeling, or the like which interfere with the crack width determination. In this case, setting the ROI so as to avoid parts corresponding to such holes or peeling makes it possible to determine the width of the crack more accurately.

Second Embodiment

In a second embodiment, different methods are used to extract the defect feature amount in accordance with the size of the defect. In other words, the feature amount is extracted from the partial image of the defect in accordance with a method selected in accordance with the size of the detected defect. Then, the attributes of the defect are determined using the extracted feature amount. Like the first embodiment, the following will describe an example in which a crack is detected from an image and the maximum crack width of that crack is determined. In the present embodiment, different methods are used to extract the defect feature amount in accordance with the length of the crack. For example, the feature amount is extracted from a broader region when determining the attributes of a long crack than when determining the attributes of a short crack, but using a feature amount having a higher expressiveness at this time makes it possible to improve the determination accuracy.

Figure 8A:
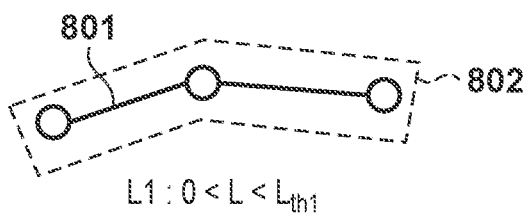
FIG. 8A is a diagram illustrating processing carried out in accordance with the length of a crack, used in a second embodiment.
Figure 8B:
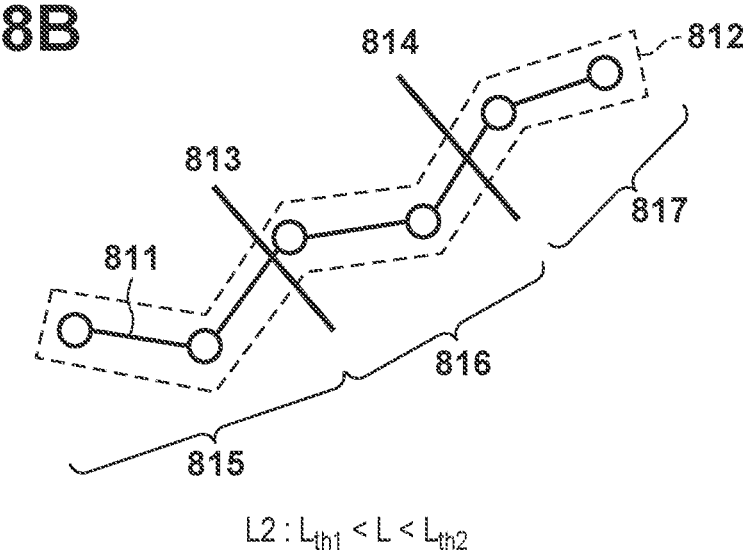
FIG. 8B is a diagram illustrating processing carried out in accordance with the length of a crack, used in the second embodiment.
Figure 8C:
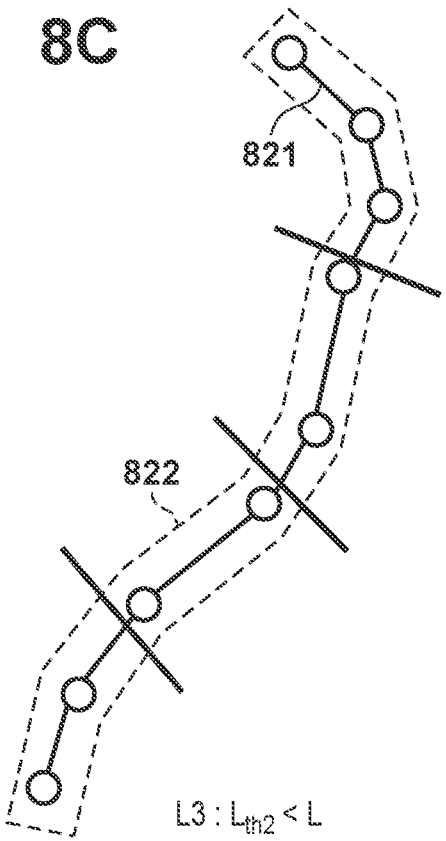
FIG. 8C is a diagram illustrating processing carried out in accordance with the length of a crack, used in the second embodiment.

Processing carried out in the present embodiment, by the second extraction unit 115 and the attribute determination unit 116 illustrated in FIG. 1, will be described next. Other processes can be carried out in the same manner as in the first embodiment and will therefore not be described. In other words, the defects (the cracks) are detected and the ROI is set for each of the defects in steps S201 to S205, in the same manner as in the first embodiment. FIGS. 8A to 8C illustrate cracks 801, 811, and 821 converted to polylines, and ROIs 802, 812, and 822, obtained through the processing leading up to step S205.

In step S206, the second extraction unit 115 first calculates the size of each defect. In the present embodiment, the second extraction unit 115 calculates a crack length L for each of the cracks. The total extension of the polyline expressing the crack, for example, can be used as the crack length L. The method of calculating the crack length L is not limited thereto. For example, the size of the ROI (e.g., the area) can also be used as the crack length L.

Next, the second extraction unit 115 sets the method for extracting the defect feature amount to be used, in accordance with the size of the defect. In the present embodiment, the second extraction unit 115 classifies each crack on the basis of the crack length L and a pre-set threshold $L_{th}$. FIGS. 8A to 8C illustrate examples of classifying the cracks into three types of categories, namely L1, L2, and L3, in accordance with the lengths of the cracks. As a specific example, when the crack length L is within a range of $0<L<L_{th1}$, the crack 801 is classified into the shortest category L1 (FIG. 8A). Likewise, the crack 811, which has a crack length L within a range of $L_{th1}<L<L_{th2}$, is determined to be in the category L2 (FIG. 8B), and the crack 821, which is in the range of $L_{th2}<L$, is determined to be in the category L3 (FIG. 8C). In this manner, the cracks 801, 811, and 821 indicated in FIGS. 8A to 8C are classified into different crack length categories.

In the second embodiment, the second extraction unit 115 determines the category of the defect (the crack) in accordance with the size of the defect (the crack length) in this manner, and then extracts the defect feature amount using a different method for each category. For example, the second extraction unit 115 extracts a defect feature amount vu of the crack 801 by generating a histogram of an image corresponding to the ROI 802, in the same manner as in the first embodiment. Here, the defect feature amount vu is a d-dimensional feature amount generated on the basis of a luminance histogram having d number of bins.

On the other hand, the crack 811 is longer than the crack 801. In the present embodiment, the defect feature amount is extracted so that the feature expression capacity of the defect feature amount increases with the length of the crack, for cracks belonging to the category L2. As a specific example, the second extraction unit 115 extracts a defect feature amount $v_{L2}$ from the ROI 812 in the following manner. In other words, the second extraction unit 115 first divides the ROI 812 into a plurality of regions. In FIG. 8B, the ROI 812 is divided into three subregions 815, 816, and 817 by region dividing lines 813 and 814. Next, the second extraction unit 115 extracts a defect feature amount based on a histogram having d number of bins (a d-dimensional feature amount) from each of the subregions 815, 816, and 817, by applying the same method as in the first embodiment to each of those subregions. The second extraction unit 115 can then obtain a 3d-dimensional feature amount as the defect feature amount of the ROI 812 by linking these three d-dimensional feature amounts. Using the same method, the second extraction unit 115 can also divide the ROI 822 into four subregions and obtain a 4d-dimensional feature amount as the defect feature amount of the crack 821.

Thus in the present embodiment, the second extraction unit 115 extracts the feature amounts so that feature amounts extracted from larger defects (e.g., the long crack 821) have a higher number of dimensions than feature amounts extracted from smaller defects (e.g., the short crack 801). According to this method, feature amounts are extracted with different dimensions depending on the category of the crack length, and the feature expression capacity of the extracted feature amount is higher for longer cracks. Although the method for dividing the ROI in the above-described method is not particularly limited, the ROI can be divided at equal intervals along the length of the crack, and can be divided so that each subregion obtained from the division has the same number of pixels, for example.

In the second embodiment, the attribute determination unit 116 determines the crack width (attribute information) using different classifiers F for each category, in order to handle defect feature amounts having different numbers of dimensions for each category of crack length. In the examples illustrated in FIGS. 8A to 8C, the classifier $F_{L1}$ is used, which makes the determination using a d-dimensional defect feature amount extracted from a crack in the category L1. Additionally, the classifier $F_{L2}$ is also used, which makes the determination using a 3d-dimensional defect feature amount extracted from a crack in the category L2. Furthermore, the classifier $F_{L3}$ is also used, which makes the determination using a 4d-dimensional defect feature amount extracted from a crack in the category L3. Each classifier is prepared in advance by separating the training data into the respective categories in accordance with the crack lengths, and training the classifier using the training data in the corresponding category (the defect feature amount and the information of the crack width).

In this manner, the defect feature amount can be extracted using a different feature extraction method depending on the size of the defect (the crack length). Note that the specific method for extracting the defect feature amount is not limited to that described above. For example, the number of categories of cracks based on the crack length, and the number of ROI divisions for each category, can be set as desired. Also, although a situation in which the ROI is divided into equal intervals has been described, the method is not limited thereto. For example, the division may be carried out so that the subregions become smaller as they approach the center of the crack.

Third Embodiment

In the first and second embodiments, the defect feature amount is extracted on the basis of a histogram of a partial image extracted from the input image. In this manner, the defect feature amount can be extracted directly from the input image. However, the defect feature amount is not limited to being extracted from a partial region of the input image, and may be any feature amount pertaining to a partial region. In a third embodiment, the defect feature amount is extracted from a feature map generated using a CNN (Convolutional Neural Network). Note that the third embodiment describes a situation in which a crack is detected as the defect and the crack width is determined as the attribute information of the defect, in the same manner as in the first and second embodiments.

In the present embodiment, a feature map having the same size as the input image is generated using a CNN. The CNN architecture is not particularly limited, an example of the CNN used in the third embodiment will be described below using FIG. 9. FIG. 9 illustrates an architecture known as "hypercolumns", disclosed in Hariharan et al., "Hypercolumns for Object Segmentation and Fine-Grained Localization", The IEEE Conference on Computer Vision and Pattern Recognition (CVPR), 2015. According to this architecture, first, an input image 900 having a width w and a height h is input to a CNN 901 serving as a base (called a "base CNN" hereinafter), as illustrated in FIG. 9. Next, outputs branch from a plurality of intermediate layers in the base CNN. Outputs from intermediate layers having sizes different from the input image size are sampled at the time of the branching, and as a result, intermediate layers 902 to 905 having the same size as the input image size are obtained. For example, an intermediate layer having a size smaller than the input image size due to pooling is upsampled (resized) at the time of branching. A feature map 906 is then generated by concatenating the intermediate layers 902 to 905. The feature map 906 is a map having the same size as the input image 900, namely a width w and a height h, and having n channels, which is the sum of the number of channels in the intermediate layers 902 to 905. The feature amount at a given pixel in the feature map 906 is expressed by an n-dimensional vector 907, for example.

As another example of CNN architecture, the CNN layer of an existing CNN architecture such as Alex Net or VGG can be used for the base CNN part. The method for generating the feature map is also not particularly limited. The feature map can be generated by obtaining the output of a desired intermediate layer of the base CNN using a desired method and converting that output to the same resolution as the resolution of the input image. Furthermore, the feature map can also be generated using an architecture that takes an intermediate layer which has shrunk due to pooling and restoring that layer to the original image size through deconvolution.

In the third embodiment, the defect feature amount is extracted using such CNN architecture. On the other hand, the process for detecting the defect can be carried out in the same manner as in the first embodiment, and a CNN can be used to improve the efficiency of the processing. An embodiment in which a CNN is used to detect the defect and extract the defect feature amount will be described next using FIGS. 10 to 12.

First, the process for detecting the defect and the process for extracting the defect feature amount will be described using FIG. 10. FIG. 10 illustrates a simplified version of the content of FIG. 9, the process for detecting a defect, and the process for determining the attribute information of the defect. In FIG. 10, the base CNN 901 is used as a common feature amount generation unit. The base CNN 901 is used both for generating the local feature amount used to detect the defect, and for generating the defect feature amount for determining the attribute information. Then, to generate the local feature amount and the defect feature amount, the base CNN 901 branches into two streams, as indicated by a stream 910 and a stream 920. In other words, the first extraction unit 111 extracts the output from the intermediate layer of the CNN into which the input image 900 has been input as the stream 910, and generates a first feature map 911 expressing a first feature amount for each pixel in the input image 900. Meanwhile, the second extraction unit 115 extracts the output from the intermediate layer of the CNN into which the input image 900 has been input as the stream 920, and generates a second feature map 921 expressing a second feature amount for each pixel in the input image 900. Here, the stream 910 and the stream 920 need not be the same, and the first feature amount and second feature amount also need not be the same.

As described above, the first feature map 911 is an n-channel map having the same size as the input image 900, namely a width w and a height h. In other words, the first feature map 911 expresses an n-dimensional feature amount (local feature amount) for each pixel of the input image 900. The defect determination unit 112 detects the defect in accordance with the first feature amount of each pixel in the input image 900, indicated by the first feature map 911. In the present embodiment, the defect determination unit 112 detects the defect in the following manner. The defect determination unit 112 generates a score map, which expresses the likelihood of each pixel corresponding to the defect, from the local feature amount of each pixel. For example, the defect determination unit 112 can calculate a score for each pixel through the following formula, which uses a sigmoid function.

$$s_{i,j} = \sigma(w \cdot v_{i,j})$$

Here, i,j indicates the coordinates of the pixel in the image, and $s_{i,j}$ expresses a score indicating the likelihood that the pixel at coordinates (i,j) corresponds to a defect. $\sigma(\ )$ indicates the sigmoid function, and $w \cdot v_{i,j}$ expresses the inner product of a vector w and a vector $v_{i,j}$. $v_{i,j}$ is an n-dimensional feature vector at coordinates (i,j) in the detected feature map, and w is a weighting vector for $v_{i,j}$. The defect determination unit 112 can generate the score map by executing this calculation for each pixel.

Although the defect determination unit 112 is described here as generating the score map using a sigmoid function, which is often used at the output layer of a neural network, the score map can be generated through a different method instead. For example, the defect determination unit 112 may calculate the score for each pixel by inputting the feature vector $v_{i,j}$ of each pixel into an SVM.

Using the score map calculated by the defect determination unit 112, the defect separating unit 113 and the region setting unit 114 can carry out the process of specifying one defect at a time and the process of setting the ROI for each defect, in the same manner as in the first embodiment.

Next, the process by which the second extraction unit 115 extracts the defect feature amount for a single defect using the ROI set by the region setting unit 114 and the second feature map 921 will be described using FIG. 11. The second extraction unit 115 calculates the defect feature amount in accordance with the second feature amount of each pixel in the partial image of the defect, indicated by the second feature map 921. Here, the partial image of the defect corresponds to an image within the ROI. An example of the method for calculating the defect feature amount will be described next.

Figure 11:
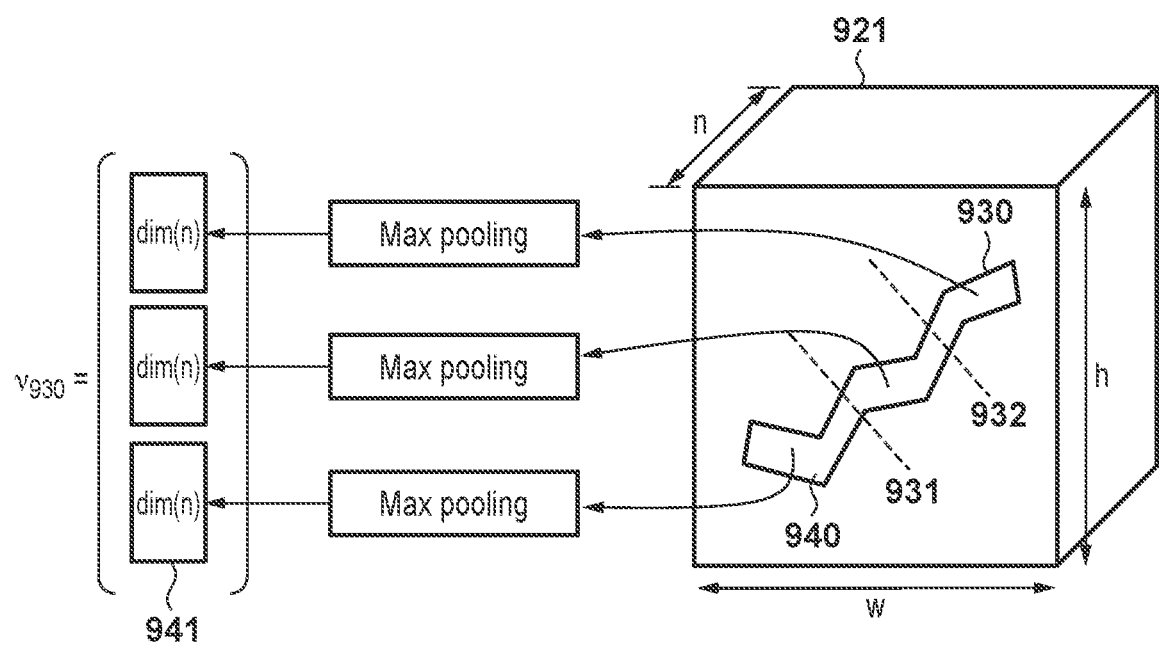
FIG. 11 is a diagram illustrating a method for extracting a feature amount according to the third embodiment.

FIG. 11 illustrates the second feature map 921. The depth direction in FIG. 11 indicating the number of channels n, and it should be noted that the orientation of how the second feature map 921 is depicted is different from that in FIGS. 9 and 10. In FIG. 11, an ROI 930 for a single defect (crack) found by the region setting unit 114 is indicated in the second feature map 921. The size of the ROI changes depending on the size of the defect (the length of the crack). On the other hand, the attribute determination unit 116 determines the attributes (crack width) of the defect using a defect feature amount having a predetermined dimension. Thus in the present embodiment, the second extraction unit 115 generates a defect feature amount $v_{930}$ for the ROI 930 as described below.

First, the second extraction unit 115 divides the ROI 930 into a plurality of subregions. The number of divisions and the method for dividing the ROI are not particularly limited, and the same method as that used in the second embodiment can be used, for example. In the example in FIG. 11, the ROI 930 is divided into three parts using dividing lines 931 and 932 so that each subregion has the same area.

Next, the second extraction unit 115 executes Max Pooling on each subregion. For example, once Max Pooling is executed on a subregion 940, a vector 941 having a maximum value is generated for each channel in the subregion 940. Here, the vector 941 is the same n-dimensional vector as there are channels in the second feature map. dim(n) indicated in FIG. 11 expresses the n-dimensional vector. Likewise, the second extraction unit 115 generates n-dimensional vectors by carrying out Max Pooling for the other subregions in the same manner. In this manner, an n-dimensional vector is generated for each of the three subregions. The defect feature amount $v_{930}$ of the ROI 930 is obtained by concatenating the three n-dimensional vectors obtained in this manner. According to this method, the defect feature amount extracted by dividing the ROI into three parts is always a 3n-dimensional feature vector regardless of the size of the ROI.

Through the method described above, a defect feature amount of a predetermined dimension can be extracted on the basis of the second feature map and an ROI of any desired size. Note that the pooling method is not particularly limited, and another method such as Average Pooling can be used, for example.

The attribute determination unit 116 can determine the attribute information of the defect using the defect feature amount in the same manner as in the first embodiment.

As described above, in the present embodiment, a CNN is used to detect the defect and determine the attribute information thereof. The CNN can be trained through error back propagation on the basis of error in the defect detection and error in the determination of the defect attributes.

A case where a plurality of defects are detected and the attributes thereof are estimated will be described as a variation. For example, a defect other than a crack, such as a deposit, can be detected at the same time as a crack. Additionally, while the crack width can be determined for the crack, for the deposit, it is possible to determine the cause of the deposit, for example.

In such a configuration, the number of streams branching from the base CNN can be increased in order to extract a local feature amount or a defect feature amount suited to the defect to be detected. For example, in addition to the streams 910 and 920, a stream used to extract a local feature amount for detecting a deposit and a stream used to extract a defect feature amount for determining the attributes of the deposit can be caused to branch from the base CNN 901 illustrated in FIG. 10. According to this configuration, feature amounts suited to the detection of different anomalies and the determination of the attributes thereof can be extracted.

Fourth Embodiment

A fourth embodiment describes an embodiment in which the parameters used to set the ROI are adjusted. In the first embodiment, a range of x pixels centered on the defect (the crack) is set as the ROI in accordance with the pre-set parameters x, as illustrated in FIG. 6. The range of the ROI used to extract the defect feature amount thus changes depending on the parameters x, and thus the attribute information (the crack width) of the defect can be found accurately by appropriately setting the parameters x. A method for adjusting the parameters x when training the classifier used by the attribute determination unit 116 and when determining the attribute information using the attribute determination unit 116 will be described next. The following method can be realized by an information processing device such as the computer 1200 illustrated in FIG. 12, for example. Additionally, the first embodiment describes a situation in which the range of the ROI is displayed in a display device for each crack. This display makes it possible for the user to understand the range of the image used to determine the crack width. The fourth embodiment will also describe an expansion and a variation on the information displayed in the display device.

Two methods for adjusting the parameters x during training will be described first. A method in which the user selects the appropriate parameters x indicating the range of the ROI in the training data can be given as the first method. In this case, the ROI can be set automatically, using a variety of parameters x, for the crack images used as the training data, and ROI ranges based on those parameters x can be presented to the user as a display that overlaps the image of the crack. At this time, each ROI may be displayed sequentially in the display device, or the ROIs may be displayed simultaneously in the display device using different colors or different line types. A plurality of values may be prepared in advance as the parameters x, or the user may sequentially set desired values.

The user then visually confirms the plurality of ROIs displayed in the display device, and selects the ROI having a range appropriate for determining the crack width. For example, for a crack passing through chipping or a hole in a concrete surface, an ROI containing the entire chipped part or hole can be given as an example of an appropriate ROI. The parameters x corresponding to the selected ROI are then used during training According to this method, the overall features of a crack including chipping, a hole, or the like can be extracted, which can make it easier to distinguish between a crack passing through a chipped part or a hole, and a crack that is simply wide.

A method of selecting parameters x that improve the accuracy of the determination of the attribute information (the crack width) from when the training data is used can be given as the second method. In this case, the training data can be divided into two parts, with one part being used as data for training the classifier, and the other part being used as data for evaluating the trained classifier. By using training data divided in this manner, the classifier can be trained and the trained classifier can be evaluated in a repeating manner while varying the parameters x. The evaluation can be carried out on the basis of an accuracy rate or the like of the crack width determination. The parameters x at which the accuracy rate is the highest can then be selected as the optimal parameters. Using such a method makes it possible to automatically select the optimal parameters x.

In this case, information pertaining to the automatically-selected parameters x can be displayed in the display device so that the user can confirm those parameters. For example, the numerical values of the parameters x can be displayed in the display device. Several images of cracks included in the training data can be displayed in the display device with the ROIs set using the parameters x superimposed thereon.

The foregoing has described a situation in which one set of optimal parameters x has been set on the basis of the training data during training During training, the classifier can be trained in the same manner as described in the first embodiment using the parameters x set in this manner. Additionally, during the determination, the region setting unit 114 can set the ROI using the parameters x set in this manner. However, the parameters x need not be limited to a single set. For example, desired parameters x can be set in accordance with the input image when determining the attribute information of the defect. A method for adjusting the parameters x at the time of the determination will be described next.

For a single defect (crack), the region setting unit 114 sets a plurality of regions in the partial image containing the defect. Then, the second extraction unit 115 and attribute determination unit 116 determine the attributes of the defect a plurality of times using each of the plurality of regions that have been set in the partial image. In the present embodiment, the region setting unit 114 sets a plurality of ROIs, using a plurality of different parameters x, for a single defect (crack). Then, the second extraction unit 115 and the attribute determination unit 116 calculate the attribute information (the crack width) in accordance with each of those ROIs. The method described in the first embodiment can be used as the method for calculating the crack width. However, the processing (steps S206 and S207) following the step in which the ROI is set (step S205) is carried out a plurality of times for a single crack, and thus a plurality of crack widths are generated. The plurality of parameters x used here may be set in advance, or may be set as desired by the user.

The plurality of crack widths obtained in this manner can be presented so that the user can compare those widths. The plurality of ROIs obtained in this manner can also be presented so that the user can compare those ROIs. For example, the input image can be displayed in the display device with the position where the crack is detected, the width of the crack, and information indicating the ROI superimposed thereon. The result of determining the crack width and the range of the ROI obtained when using each set of parameters x can also be switched and displayed in accordance with the respective parameters x. The result of determining the crack width and the range of the ROI can also be displayed in the display device so that the result of comparing those pieces of information can be seen. The user can then select the appropriate determination result by viewing the displayed results.

Furthermore, the user can select the appropriate parameters x on the basis of the displayed results. For example, the information processing device 100 can carry out the determination using a plurality of parameters x, using an image of part of the inspection subject as the input image, and the user can then select the parameters x on the basis of that result. In this case, the information processing device 100 can determine the crack width using the parameters x selected by the user, for the remainder of the image of the inspection subject.

The parameters used to determine the range of the ROI are not limited to the above-described parameters x. For example, if the angle threshold $\theta_{th}$ used to determine the range of a single crack as described in the first embodiment is changed, the range of the single crack that is determined also changes. The ROI set for that single crack also changes as a result. Accordingly, this angle threshold $\theta_{th}$ is also a parameter used to set the ROI, and can be set to an appropriate value using a similar method. In other words, parameters used by the defect separating unit 113 to specify individual defects can also be adjusted in the same manner, as parameters for determining the range of the ROI.

Fifth Embodiment

In the first to fourth embodiments, a region within a predetermined distance, centered on the defect (the crack), is set as the ROI, as illustrated in FIG. 6, for example. In a fifth embodiment, the range of the ROI is set by setting a plurality of patch regions (local regions) at the position of the detected defect. Aside from the processing in steps S205 and S206, the configuration and processing according to the present embodiment are the same as in the first to fourth embodiments, and thus redundant descriptions will be omitted.

Figure 13A:
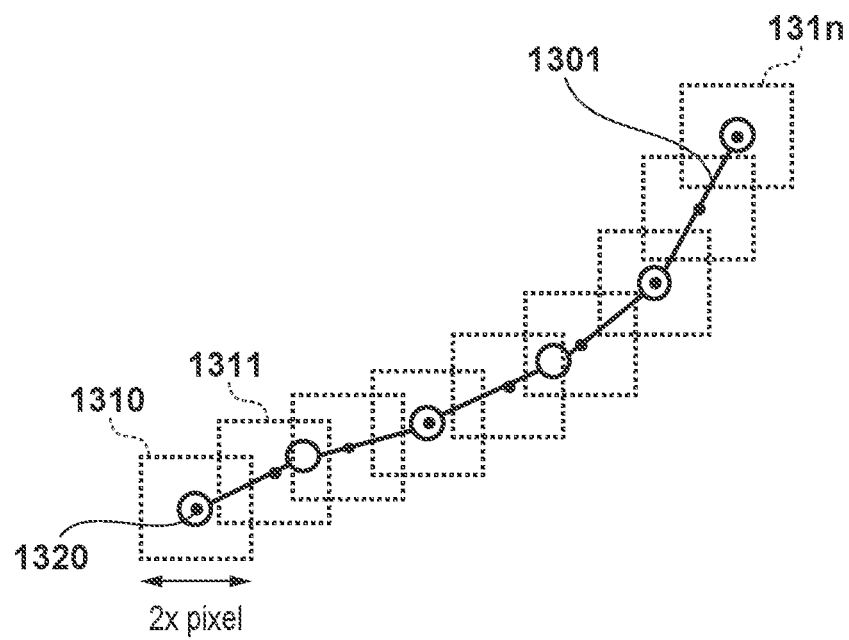
FIG. 13A is a diagram illustrating a method for extracting a feature amount according to a fifth embodiment.

FIG. 13A is a diagram illustrating an ROI set in the fifth embodiment. In FIG. 13A, an ROI is set for a single detected defect (a crack 1301). FIG. 13A indicates a patch region 1310, which is a square region, centered on a position 1320 of the crack 1301, having 2x pixels to a side. As in the above-described embodiments, x represents the parameters for determining the range of the ROI. The shape of the patch region is not limited to a square, and can be any desired shape, such as a rectangle, a circle, an ellipse, or the like, for example.

In step S205 of the present embodiment, the region setting unit 114 sets a plurality of such patch regions for the defect, for which the attribute information is to be determined. In FIG. 13A, n number of patch regions 1310, 1311, and so on up to 131n, which are centered on the position of the crack, are set on the crack 1301. The entirety of these patch regions serve as the ROI region in which the feature amount for determining the attribute information of the crack 1301 is calculated. The method for setting the plurality of patch regions is not particularly limited. The patch regions may be set so as to overlap with each other, or may be set so as not to overlap with each other by adjusting the center positions of the patch regions. Additionally, the patch regions may be arranged on the crack at equal intervals, or may be set to desired positions on the crack. A method in which the centers of the patch regions are selected at random from pixels on the crack, and a method of selecting characteristic pixels on the crack, can be given as examples of methods for setting the patch regions at unequal intervals.

Figure 13B:
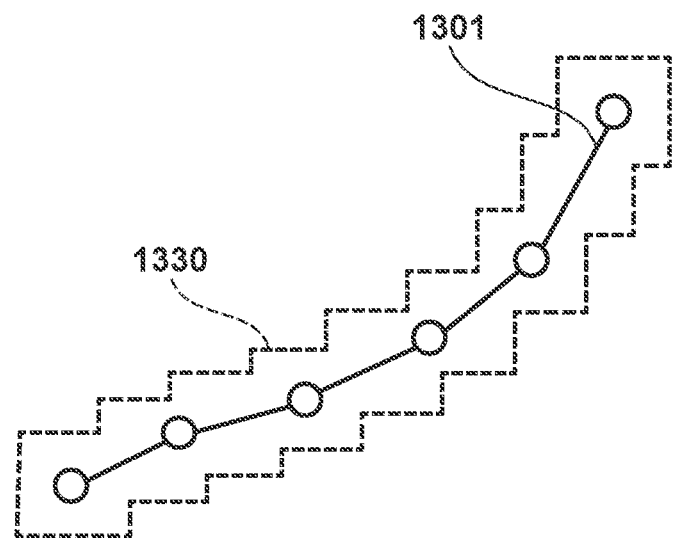
FIG. 13B is a diagram illustrating a method for extracting a feature amount according to the fifth embodiment.

Next, in step S206, the second extraction unit 115 generates the defect feature amount from the ROI region that has been set. As described above, the second extraction unit 115 generates the defect feature amount from an image contained in one of the plurality of patch regions. For example, as illustrated in FIG. 13B, the second extraction unit 115 generates a histogram feature amount in the same manner as in the first to fourth embodiments, from an image within a bounding line 1330 around the plurality of patch regions.

The method for generating the defect feature amount is not limited thereto. For example, the second extraction unit 115 may extract a feature amount from each patch region. In this case, the defect feature amount of the ROI range can be generated by combining those feature amounts. For example, the second extraction unit 115 can extract a minimum luminance value of the image for each patch region as the feature amount of each patch region. In the example illustrated in FIG. 13A, n number of patch regions 1310 to 131n are present, and thus n number of minimum luminance values are extracted. Converting these n number of minimum luminance values to a histogram makes it possible to generate a defect feature amount for the overall ROI region of the crack 1301.

The feature amount extracted from each patch region here is not limited to the minimum luminance value, and any desired image feature amount can be extracted. For example, the maximum value of an edge strength within the patch region, an HOG feature amount, or the like can be extracted as the feature amount. Additionally, a plurality of types of feature amounts may be extracted from a single patch region. For example, a minimum luminance value and an edge strength maximum value may be extracted from each patch region. In this case, a vector in which a histogram feature amount of the minimum luminance value and a histogram feature amount of the edge strength maximum value are concatenated can be used as the defect feature amount of the ROI region.

In the present embodiment, the attribute information of the defect is determined using the defect feature amount generated as described above. The same methods as those described in the first to fourth embodiments can be used to determine the attribute information. As described above, the method for selecting the partial image of the defect from which the defect feature amount is extracted, i.e., the method for setting the ROI region, is not particularly limited. The method for generating the feature amount in the partial image of the defect is also not limited. Note that the defect feature amount can be generated during training by using the same method as that used during the determination.

The accuracy of determinations can be improved in a technique that determines the attributes of a defect of an object appearing in an image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing device comprising:
one or more memories storing instructions; and
one or more processors executing the instructions to:
(1) set a plurality of regions in an input image obtained by image capturing of a structure such that each of the set plurality of regions includes at least a portion of a crack of the structure;
(2) determine a plurality of widths of the crack in the set plurality of regions, respectively, using a CNN (Convolutional Neural Network); and
(3) display the determined plurality of widths of the crack in the set plurality of regions to enable comparison of the determined plurality of widths of the crack in the set plurality of regions.

2. The information processing device according to claim 1, wherein the one or more processors further execute the instructions to:
(1) set a plurality of first regions in the input image such that each of the set plurality of first regions includes at least a portion of a first crack of the structure;
(2) set a plurality of second regions in the input image such that each of the set plurality of second regions includes at least a portion of a second crack of the structure;
(3) determine a plurality of widths of the first crack in the set plurality of first regions, respectively, using the CNN;
(4) determine a plurality of widths of the second crack in the set plurality of second regions, respectively, using the CNN;
(5) display the determined plurality of widths of the first crack in the set plurality of first regions to enable comparison of the determined plurality of widths of the first crack in the set plurality of first regions; and
(6) display the determined plurality of widths of the second crack in the set plurality of second regions to enable comparison of the determined plurality of widths of the second crack in the set plurality of second regions.

3. The information processing device according to claim 1, wherein the one or more processors further execute the instructions to detect a crack of the structure from the input image using the CNN.

4. The information processing device according to claim 3, wherein the one or more processors further execute the instructions to:
generate a first feature and a second feature with respect to the input image using the CNN, the first feature being for detecting the crack of the structure, and the second feature being for determining the width of the crack of the structure;
detect the crack of the structure using the first feature; and
determine the width of the crack of the structure using the second feature.

5. The information processing device according to claim 1, wherein the one or more processors further execute the instructions to superimpose, on the input image, the detected crack of the structure and the determined width of the crack of the structure.

6. The information processing device according to claim 1, wherein the one or more processors further execute the instructions to display the set plurality of regions to enable comparison of the set plurality of regions.

7. The information processing device according to claim 1, wherein the one or more processors further execute the instructions to:
obtain a user input selecting one width of the crack from the determined plurality of widths of the crack; and
determine the width of the crack to be the selected one width.

8. The information processing device according to claim 1, wherein the one or more processors further execute the instructions to display a set region and to switch display between the set plurality of regions.

9. The information processing device according to claim 1, wherein the one or more processors further execute the instructions to:
(1) set a plurality of regions in the input image such that each of the set plurality of regions includes at least a portion of a single crack of the structure;
(2) determine a plurality of widths of the single crack in the set plurality of regions, respectively, using the CNN; and
(3) display the determined plurality of widths of the single crack in the set plurality of regions to enable comparison of the determined plurality of widths of the single crack in the set plurality of regions.

10. An information processing method comprising:
setting a plurality of regions in an input image obtained by image capturing of a structure such that each of the set plurality of regions includes at least a portion of a crack of the structure;
determining a plurality of widths of the crack in the set plurality of regions, respectively, using a CNN (Convolutional Neural Network); and
displaying the determined plurality of widths of the crack in the set plurality of regions to enable comparison of the determined plurality of widths of the crack in the set plurality of regions.

11. A non-transitory computer-readable medium storing a program which, when executed by a computer comprising a processor and a memory, causes the computer to perform a method comprising:
- setting a plurality of regions in an input image obtained by image capturing of a structure such that each of the set plurality of regions includes at least a portion of a crack of the structure;
- determining a plurality of widths of the crack in the set plurality of regions, respectively, using a CNN (Convolutional Neural Network); and
- displaying the determined plurality of widths of the crack in the set plurality of regions to enable comparison of the determined plurality of widths of the crack in the set plurality of regions.

* * * * *